United States Patent
Garlick et al.

(10) Patent No.: US 6,614,448 B1
(45) Date of Patent: Sep. 2, 2003

(54) CIRCUIT AND METHOD FOR DISPLAYING IMAGES USING MULTISAMPLES OF NON-UNIFORM COLOR RESOLUTION

(75) Inventors: Benjamin J. Garlick, Sunnyvale, CA (US); Edward A. Hutchins, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/222,441

(22) Filed: Dec. 28, 1998

(51) Int. Cl.[7] .............................................. G06G 5/36

(52) U.S. Cl. ..................... 345/605; 345/600; 345/698; 345/3.3

(58) Field of Search ................................ 345/600, 667, 345/668, 669, 670, 671, 589, 593, 698, 605, 3.3

(56) References Cited

U.S. PATENT DOCUMENTS

| | | | | |
|---|---|---|---|---|
| 4,855,745 A | * | 8/1989 | Smither | 341/118 |
| 5,070,332 A | * | 12/1991 | Kaller et al. | 341/136 |
| 5,086,295 A | * | 2/1992 | Boettcher et al. | 340/701 |
| 5,231,398 A | * | 7/1993 | Topper | 341/139 |
| 5,389,929 A | * | 2/1995 | Nayebi et al. | 341/122 |
| 5,481,275 A | * | 1/1996 | Mical et al. | 345/132 |
| 5,488,687 A | * | 1/1996 | Rich | 395/164 |
| 5,608,399 A | * | 3/1997 | Coleman, Jr. | 341/139 |
| 5,684,939 A | * | 11/1997 | Foran et al. | 395/131 |
| 5,764,175 A | * | 6/1998 | Pan | 327/52 |
| 5,933,131 A | * | 8/1999 | Rich | 345/155 |
| 6,072,500 A | * | 6/2000 | Foran et al. | 345/431 |
| 6,091,425 A | * | 7/2000 | Law | 345/433 |

(List continued on next page.)

OTHER PUBLICATIONS

Bhaskaran, Vasudev and Konstantinos Konstantinides, *Image and Video Compression Standards: Algorithms and Architectures*, Kluwer Academic Publishers, ©1995, pp. 15–86 and 129–159.

Poynton, Charles A., *A Technical Introduction to Digital Video*, John Wiley & Sons, Inc., ©1996, pp. 155–184.

*Primary Examiner*—Jeffery Brier
*Assistant Examiner*—Daniel Chung
(74) *Attorney, Agent, or Firm*—Townsend and Townsend and Crew LLP

(57) ABSTRACT

A graphics processor displays pixels in an image at non-uniform resolution, using a maximum resolution in the interior of a surface in the image, and a lower resolution at edges. Higher color resolution in the interior eliminates color aliasing that would otherwise be caused if the interior were displayed at the lower resolution. Lower resolution at the edges is not noticeable to the human eye, and allows the graphics processor to use one or more low resolution color signals in generating the displayed image, thereby reducing hardware (e.g. memory locations required to store such signals, and lines required to route such signals). One such processor (not necessarily a graphics processor) includes a resolution reducer and a resolution enhancer that respectively reduce and enhance the resolution of a signal. Specifically, the resolution reducer reduces the resolution of a high resolution signal to generate a low resolution signal. The resolution enhancer enhances the low resolution signal to generate a signal (called "enhanced resolution signal") having the same number of bits as the high resolution signal. One such resolution reducer simply drops a number of least significant bits to generate a low resolution signal, and the corresponding resolution enhancer passes, as the enhanced resolution signal, the low resolution signal and the above-described number of least significant bits of a high resolution signal. The enhanced resolution signal is not a significant aspect of one embodiment because in some embodiments the low resolution signal and the high resolution signal are used directly.

42 Claims, 18 Drawing Sheets

U.S. PATENT DOCUMENTS 6,191,772 B1 * 2/2001 Mical et al. ................. 345/132
6,232,901 B1 * 5/2001 Abbey ........................ 341/143
6,233,060 B1 * 5/2001 Shu et al. .................... 358/1.9
6,292,194 B1 * 9/2001 Powell, III .................. 345/430
6,310,591 B1 * 10/2001 Morgan et al. ............... 345/84
6,335,760 B1 * 1/2002 Sato ........................... 345/698

* cited by examiner

CIRCUIT AND METHOD FOR DISPLAYING IMAGES USING MULTISAMPLES OF NON-UNIFORM COLOR RESOLUTION

BACKGROUND OF THE INVENTION

A personal computer 100 (FIG. 1A) includes a graphics processor 104 that generates a display of a three-dimensional (abbreviated as "3D") image on a screen 101 under the control of a central processing unit 105. Graphics processor 104 forms the displayed image from descriptions of one or more graphics primitives, such as a triangle 106 (FIG. 1B) that covers a picture element (called "pixel") 107. The image displayed on screen 101 is typically formed by a two-dimensional array of such pixels, each of which has color.

Graphics processor 104 changes the color of pixel 107 depending on the location of triangle 106 relative to the center 108 of pixel 107. In the example illustrated in FIG. 1B, center 108 falls outside of triangle 106, and graphics processor 104 leaves the attributes of pixel 107 unchanged. However, when center 108 falls inside triangle 106, pixel 107 is colored the color of triangle 106. One pixel (e.g. pixel 113) being fully colored (triangle's color) while an adjacent pixel (e.g. pixel 107) being not colored results in a defect noticeable to the human eye, in a problem called "aliasing."

The aliasing problem is reduced (or even eliminated) when fractional coverage of a pixel by a triangle (or other primitive) causes a change in the color displayed for the pixel by a corresponding fractional amount. Such fractional change of a pixel's color requires obtaining multiple samples of colors for each pixel, in a process called "multisampling." For example, four colors (also called "multisamples") can be produced from rasterization (a well known process), one for each of four locations A–D (FIG. 1C) within pixel 107 (instead of just one location 108 as described above).

Graphics processor 104 treats each multisample as a miniature pixel throughout the whole rendering process. At the point of display, processor 104 averages the four multisamples to obtain an averaged color, and displays the pixel at the averaged color (also called "resolve color"). For example, a pixel 109 (FIG. 1D) has two multisamples covered by triangle 106 and two other multisamples covered by triangle 110. Therefore pixel 109 is displayed at an equal blend of the colors of triangles 106 and 110. For clarity, the four multisamples of each of various pixels (e.g. pixels 109 and 112) are not labeled. If triangle 106 is green and triangle 110 is red, then pixel 109 is displayed in a greenish-red color. Similarly, another pixel 112 (FIG. 1E) has three multisamples covered by triangle 106 and a fourth multisample covered by triangle 111, and is therefore displayed at a color that is three quarters red and one quarter black (if triangle 111 is black).

Another type of aliasing occurs when there is insufficient resolution (also called "depth") in the color signal used to display the image on screen 101 (FIG. 1A). For example, when the displayed image includes a color ramp going from left to right, with red on the left and green on the right, if there is sufficient color resolution the color of the displayed image changes gradually and smoothly along the horizontal axis. However, if there is insufficient color resolution, vertical bands of different colors are noticeable. Color resolution depends on the number of bits used in a signal used to identify the color, such as 24 bits (wherein each of red, green and blue signals are stored in 8 bits) or 16 bits (wherein red and blue signals are stored in 5 bits each and green signal is stored in 6 bits). At the minimum color resolution, the color signal has just 3 bits (1 bit for each of red, green and blue), and vertical bands are clearly noticeable when a color ramp is displayed.

If n multisamples are used for each pixel, and 24 bits are used to store the color signal for each multisample, each pixel requires 24*n bits (e.g. 96 bits when n is 4). The just-described examples 96 bits is an insignificant amount of memory if processor 104 only processes one pixel at a time. However, a significant amount of memory is required outside processor 104, e.g., in a frame buffer implemented by a DRAM. In a "tiled" architecture, screen 101(FIG. 1A) is subdivided into rectangular areas (called "tiles"), and processor 104 must process, at any one time, all the pixels in such an area. Such an area can be, for example, 32 pixels tall and 32 pixels wide, thereby requiring processor 104 to have a minimum of 32*32*96 bits (i.e. 12 KB) of memory. If the number of multisamples or the number of bits for color resolution is increased, the amount of memory required is also increased.

SUMMARY OF THE INVENTION

A graphics processor in accordance with this invention displays pixels in an image using signals having resolution that is non-uniform across the image. In one embodiment, the graphics processor uses signals having a first resolution (also called "higher resolution") in the interior of a surface in the image, and signals having a second resolution (also called "lower resolution") at edges (also called "discontinuities") of the surface. The just-described signals can be any signals in a graphics processor that indicate a predetermined attribute, such as color.

Use of higher resolution of a color signal in the interior of a surface eliminates color aliasing (also known as "mach banding") that would otherwise occur in the interior if the interior were displayed at the lower resolution. At the discontinuities, use of multisamples having lower resolution of color or even discarding color in favor of luminance is not noticeable to the human eye when a pixel obtained from such multisamples is displayed. Such use of signals having two or more widths (in the form of resolutions in this example) allows the graphics processor to use one or more multisample signals at a lower resolution than the prior art, thereby reducing hardware (e.g. memory locations required to store such signals, and lines required to route such signals).

In one embodiment of the invention, a processor (not necessarily a graphics processor) includes a resolution reducer and a resolution enhancer that respectively reduce and enhance the resolution (and therefore the number of bits) of a signal that is to be stored or transmitted within the processor. Specifically, the resolution reducer reduces the resolution of a high resolution signal to generate a low resolution signal while maintaining another high resolution signal unchanged. Thereafter, the processor performs in one or more intermediate circuits various actions (such as storage and/or transmission) on the high and low resolution signals. An example of an intermediate circuit is a memory that stores the high and low resolution signals in two storage circuits wherein one of the storage circuits has fewer number of storage locations than the other of the storage circuits.

Next, the resolution enhancer enhances the low resolution signal to generate a signal (called "enhanced resolution signal") having the same number of bits as the high resolution signal. Thereafter, the processor uses the enhanced resolution signal in the normal manner, e.g. uses an enhanced color signal (that is obtained by enhancing a low resolution color signal) to display an image. An enhanced resolution signal of the type described herein is provided to any circuit that normally receives the high resolution signal, e.g. provided to a rendering stage in a pipeline of a graphics processor.

In one embodiment, a resolution reducer includes a truncator that simply drops a predetermined number of least significant bits (also called "low order bits") of a high resolution signal to generate the low resolution signal. Thereafter, the unchanged (high) resolution signal and the changed (low) resolution signal are both processed within the processor in a manner similar or identical to one another, e.g. both stored and/or both transmitted. Note that the low resolution signal of this embodiment can be directly displayed (in the normal manner) if necessary, without any further processing. Maintenance of a high resolution signal unchanged is a critical aspect of this embodiment, because the high resolution signal is used by the resolution enhancer (as discussed next) to generate the enhanced resolution signal from the low resolution signal.

Specifically, in this embodiment, a resolution enhancer receives the low resolution signal on a low resolution bus, and in addition also receives on a high resolution bus the high resolution signal that is normally stored or transmitted in a similar manner to the low resolution signal. Thereafter, the resolution enhancer passes to an enhanced resolution bus, as the enhanced resolution signal, the low resolution signal and the above-described number of least significant bits of the high resolution signal. That is, in this embodiment, the enhanced resolution signal is merely a concatenation (obtained by simply passing the to-be-concatenated signals to lines that are located next to each other) of the low resolution signal and a portion of the high resolution signal that together form the enhanced resolution signal.

Dropping least significant bits to form low resolution signals, and concatenating least significant bits from a high resolution signal to form enhanced resolution signals requires just lines, and no other circuitry. Specifically, such lines couple the least significant lines of the high resolution bus to the least significant lines of the enhanced resolution bus. In such an implementation, each of the resolution reducer and the resolution enhancer is devoid of any circuitry such as a logic element and a storage element. Therefore, the hardware required for implementing such a resolution reducer and a resolution enhancer is one or more orders of magnitude lower than the hardware required to implement a prior art method of compression and decompression.

In one implementation, a graphics processor changes (reduces and enhances) the resolution of one or more multisample signals (that are to be averaged prior to displaying a pixel in an image). When a pixel (also called "interior pixel") is entirely covered by a graphics primitive (such as a triangle), the low resolution signal (obtained after reducing the resolution) is exactly identical to a first number of most significant bits (also called "high order bits") of the high resolution signal. In such a case, there is no loss of information in reducing and enhancing the resolution, because after enhancement the enhanced resolution signal is exactly identical to the high resolution signal (i.e. the enhanced resolution signal is exactly correct—there is absolutely no error whatsoever). Therefore, a signal obtained after averaging of the multisample signals remains identical to the high resolution signal. Such correctness of the enhanced resolution signal allows the graphics processor to display the interior pixel at the maximum resolution (equal to the total number of bits of the high resolution signal).

When a pixel (also called "edge pixel") is only partially covered by the graphics primitive, at least one multisample signal is changed to the color of the graphics primitive, while at least another multisample signal remains unchanged. Therefore, the most significant bits of at least two multisample signals of such a pixel are different. After resolution reduction and enhancement, error is introduced in the least significant bits of the enhanced resolution signal (because the least significant bits are made equal during enhancement although originally these bits of the two multisamples were not identical). Such error is similar to noise. Specifically the graphics processor displays the edge pixel in exactly the same manner as an interior pixel, but the effective color resolution of the edge pixel is lower than the resolution of an interior pixel due to the just-described error. Note that there is no distinction in the two sets of acts that are performed to respectively display an edge pixel and an interior pixel. The number of least significant bits that are dropped during resolution reduction is predetermined to be sufficiently low to ensure that the human eye does not notice the difference in resolution at the edges in a displayed image, e.g. at junctions of one or more triangles. Therefore the error introduced by resolution reduction as described herein does not result in any noticeable artifacts in the displayed image (i.e. artifacts although present are imperceptible due to their location at the image's edges).

Resolution reduction as described herein results in correct color at the maximum resolution for an interior pixel, and correct color only at a low resolution for an edge pixel. The resolution of color of a pixel in accordance with the invention is non-uniform, and changes depending on the location of a pixel relative to one or more surfaces in the displayed image. In one specific implementation, a graphics processor uses four multisample signals per pixel, wherein three of the four signals have their resolution reduced (and enhanced). In one implementation, all three low resolution signals are 16 bits wide, and the fourth (high resolution) signal is 24 bits wide. In this implementation, the resolution enhancer passes the same portion—8 least significant bits (3 for red, 2 for green and 3 for blue)—of the high resolution signal to three enhanced resolution buses to form three 24 bit enhanced resolution signals.

Although in one embodiment the resolution reducer includes a truncator that just drops the predetermined number of low order bits, thus storing at least the most significant bit (MSB), alternative embodiments of the resolution reducer perform different or additional acts of compression to reduce the number of bits of one or more high resolution signals. In one alternative embodiment, the high resolution signal is mathematically transformed, e.g. by performing a logarithmic operation or by conversion from a first color encoding (e.g. RGB) to a second color encoding (e.g. luma color difference) and thereafter the resolution is reduced (e.g. by dropping color difference bits). In this embodiment, after the above-described dropping of bits to obtain three low resolution multisample signals, all four multisample signals are compressed in compression circuits by a well-known lossless compression method, such as JPEG lossless compression as described in Chapter 2 of the book entitled "Image and Video Compression Standards" by Vasudev Bhaskaran and Konstantinos Konstantinides, Kluwer Academic Publishers, 1995 (see pages 15–51 that are incorporated by reference herein). In this embodiment, when the four multisample signals are decompressed in decompression circuits, the high resolution multisample signal is recovered unchanged, and is used to enhance the three low resolution multisample signals as described herein.

In another such alternative embodiment, instead of truncation (as described above), three of the multisample signals are compressed (in compression circuits) by a well-known lossy compression method, such as JPEG lossy compressions described in Chapter 3 of the above-described book (see pages 52–86 that are incorporated by reference herein). Depending on the implementation, the fourth multisample signal is compressed by a lossless compression method, or left as is. In either of the just-described implementations, the fourth multisample signal is recovered unchanged on decompression (in a decompression circuit), and is used as described herein.

In yet another such alternative embodiment, three multisample signals are compressed by a first lossy compression method (in compression circuits), while the fourth multisample signal is compressed by a second lossy compression method (in another compression circuit). The second lossy compression method preserves more resolution than the first lossy compression method, so that the fourth multisample signal (when uncompressed) has a medium resolution that is greater than the resolution of the three multisample signals (when uncompressed). In this embodiment as well, the fourth multisample signal can be used to enhance resolution of the three multisample signals. Note that in each embodiment described above, when all signals input to a resolution reducer are identical, all signals output by a resolution enhancer are also identical.

In one variant of the above-described embodiments, a first resolution enhancer is directly coupled to a resolution reducer by just lines in the processor. The first resolution enhancer allows transmission (on the lines) of one or more low resolution signals for each pixel (e.g. the above-described three low resolution signals and one high resolution signal). After the first resolution enhancer enhances resolution of the low resolution signals, the enhanced resolution signals are to be input to another circuit, such as a stage of the pipeline. In one variant of the just-described embodiment, an adder stage located downstream from the first resolution enhancer generates an averaged signal for display of an image on a screen.

In another variant of the above-described embodiments, a second resolution enhancer is coupled to the output terminals of a number of storage circuits (such as static random access memories abbreviated as SRAMs). The second resolution enhancer allows storage of one or more multisamples signals of each pixel at a low resolution (e.g. three low resolution signals and one high resolution signal). The second resolution enhancer enhances resolution of the low resolution signals whenever the memory is read. Therefore, in this embodiment, low resolution signals are stored in and retrieved from the storage circuits prior to receipt by the second resolution enhancer (for enhancement of the low resolution signals).

In one implementation, a graphics processor includes a resolution reducer, a memory coupled to receive one or more low resolution signals from the resolution reducer, a second resolution enhancer coupled to output terminals of the memory, a first resolution enhancer coupled to also receive one or more low resolution signals from the resolution reducer, and an adder stage coupled to the first resolution enhancer. Such use of two resolution enhancers reduces both transmission lines and memory size, and yet allows such a graphics processor to generate an image that does not have any noticeable artifacts.

Although the above-described embodiments require a resolution enhancer to enhance resolution of the low resolution signal, resolution enhancement is not required in an alternative embodiment. In one such alternative embodiment, a resolution reducer reduces the resolution (as described above), and one or more intermediate circuits process the high and low resolution signals (also as described above). Thereafter, the high and low resolution signals are used directly (i.e. without enhancement). In one variant, the signals represent multisamples in a pixel. In this variant, one or more low resolution color signals that are representative of only luminance, and a luminance portion of a high resolution color signal are combined in a blender (hereinafter "luminance blender") to obtain an average luminance for the pixel. Thereafter, the color portions of the high resolution color signal are used with the just-described average luminance to display the pixel. Therefore, resolution enhancement is not a critical aspect of the invention.

Although one example of the invention is implemented in a graphics processor, in other examples of the invention, the circuitry and method described herein are used in other processors. Examples of signals that may be processed in such other processors include signals for temperature and pressure.

DETAILED DESCRIPTION

Figure 1A:
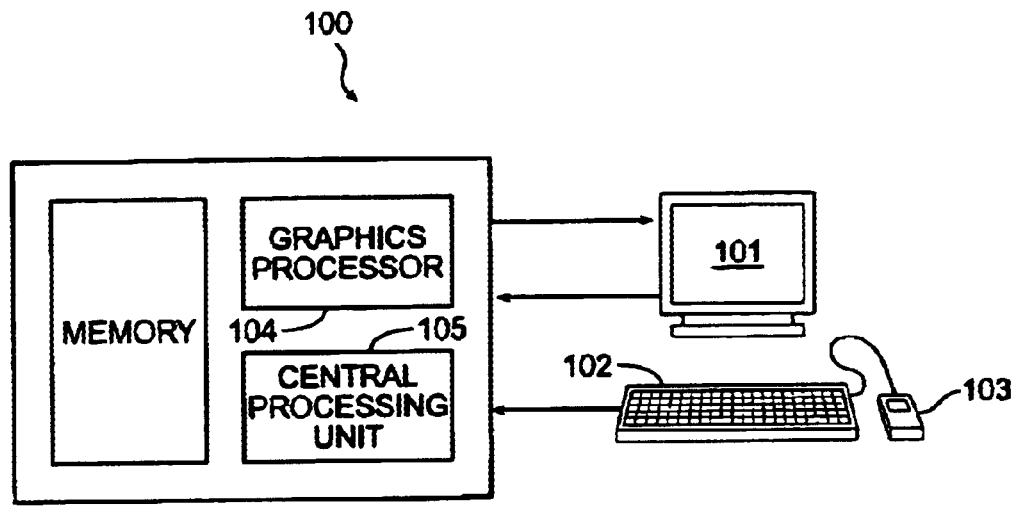
FIG. 1A illustrates a prior art computer system including a graphics processor.
Figure 1B:
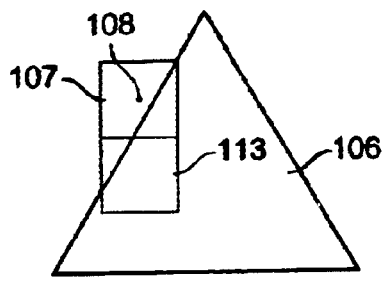
FIGS. 1B–1E illustrate relationships between pixels (shown as squares), graphics primitives (shown as triangles), and multisamples (shown as dots) used to display on screen 101 in FIG. 1A an image (not shown).
Figure 1C:
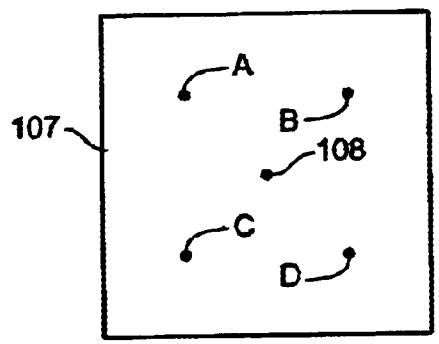

A graphics processor in accordance with this invention displays an image 220 (FIG. 2A) using a method 210 (FIG. 2B) to display pixels at non-uniform resolution, with the resolution changing in different parts of image 220. Specifically, method 210 displays (as illustrated by act 212 in FIG. 2B) a pixel 221I (FIG. 2A) that is completely covered by a graphics primitive 208 at a maximum resolution (also called "higher resolution"), e.g. at 24 bit color resolution. Method 210 displays (as illustrated by act 212 in FIG. 2B) a pixel 222J that is only partially covered by graphics primitive 208 at a resolution that is effectively lower than the maximum resolution, e.g. at 16 bit color resolution (with bits beyond the lower resolution having an approximate or incorrect value). Therefore, each of interior pixels 221A–221P (wherein A≦I≦P, P being the number of interior pixels in image 220) are effectively displayed at the maximum resolution, while edge pixels 222A–222R (wherein A≦J≦R, R being the number of edge pixels in image 220) are displayed at a lower resolution.

Display of image 220 at the maximum (e.g. 24 bit) resolution in the interior of graphics primitive 208 eliminates aliasing that would otherwise be caused if the entire image 220 (including the interior) were displayed only at the lower resolution. Use of lower (e.g. 16 bit) resolution at discontinuities in an image is not noticeable to the human eye, but allows reduction in hardware (e.g. memory locations required to store such signals, and lines required to transmit such signals) in the graphics processor (as compared to displaying pixels at the maximum resolution throughout the image).

Therefore, the effective resolution of each of pixels 221A–221P and 222A–222R is unrelated to the physical location of the pixel on the screen, and instead changes dynamically depending on image 220 being displayed. Although edge pixels 222A–222R have the same number of bits as interior pixels 221A–221P, a predetermined number (e.g. 8) of the least significant bits of edge pixels 222A–222R are ineffective. That is, complex pixels that are located at discontinuities in image 220, such as edge pixels 222A–222R have a lower resolution than simple pixels that are located wholly within a surface, e.g. interior pixels 221A–221P. So, if a pixel is simple (e.g. pixel 221I), a smaller amount of information is stored in a given number of bits (e.g. 24 bits) as compared to a complex pixel (e.g. pixel 222A). The additional information required to be stored for a complex pixel is stored in the same number of bits (e.g. the 24 bits) at the expense of lower resolution for the complex pixel.

Figure 1D:
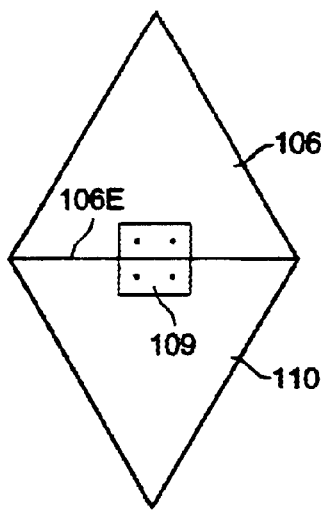
Figure 1E:
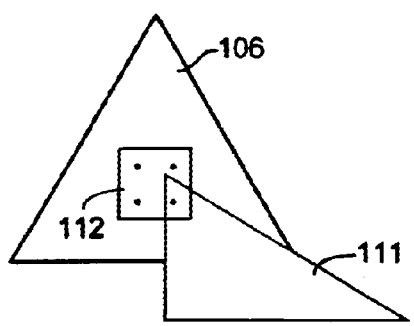

Also in accordance with the invention, not all edge pixels need be displayed at the lower resolution, for example if the same color is displayed on both sides of an edge. In one such example, edge pixel 109 (FIG. 1D) is displayed at the maximum resolution in accordance with the invention if both triangles 106 and 110 are of the same color, or even if the two triangles have different colors in the interior but the same color at edge 106E. Instead of color, any other attribute such as depth can be displayed at the different resolutions.

Figure 2A:
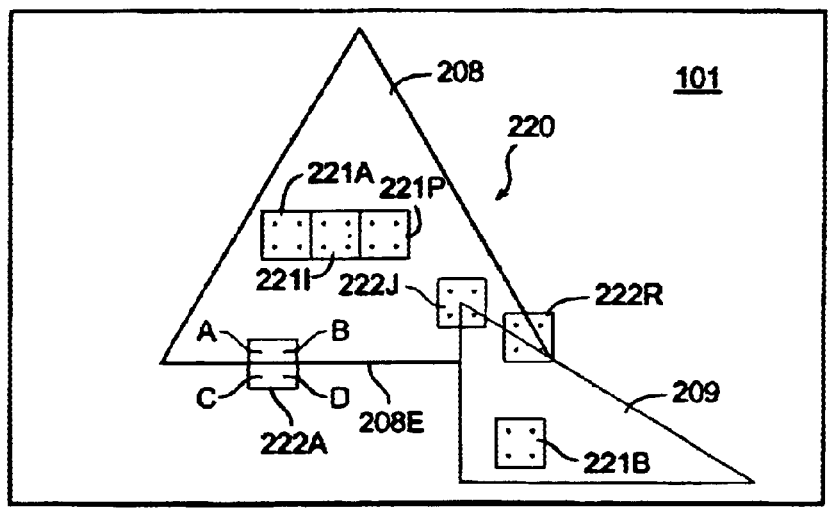
FIG. 2A illustrates relationships between pixels and graphics primitives, and multisamples of non-uniform resolution used in one embodiment of the invention to display an image (e.g. on screen 101 in FIG. 1A).
Figure 2B:
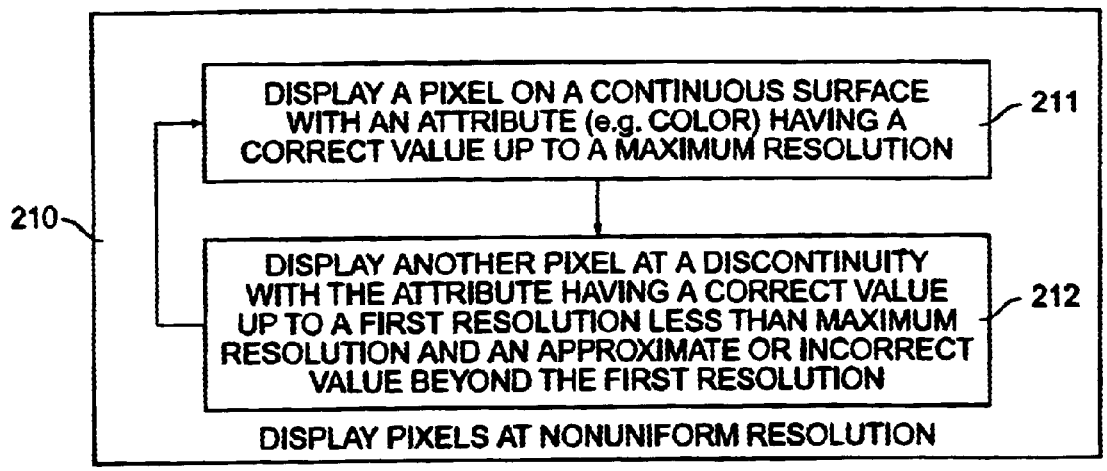
FIG. 2B illustrates, in a high level flow chart, acts performed in one embodiment of the invention to generate pixels of non-uniform resolution using multisamples of the type described in FIG. 2A.

In one embodiment, for each of pixels 221A–221P and 222A–222R that form image 220 (FIG. 2A), a processor changes the resolution of one or more multisample signals (e.g. signals for each of locations A-C shown in pixel 222A in FIG. 2A) that are to be averaged with another multisample signal (e.g. for location D) prior to displaying image 220. For simplicity, hereinafter the same reference numerals A–D are used for both the locations inside a pixel and for multisample signals at these locations. Multisample signals A–D can be color signals that are encoded in any manner, such as RGB encoding or YUV encoding. Note that in other embodiments, the signals for pixels 221A–221P and 222A–222P can be obtained by other methods (such as a compression technique), and yet have the difference in resolution as described herein.

In one implementation, for each interior pixel 221I that is entirely covered by graphics primitive 208, a graphics processor 300 (FIG. 3A) reduces the resolution (as illustrated by act 301 in FIG. 3A) of one or more multisample signals (e.g. signals A–C), while maintaining one of the multisample signals (e.g. signal D) unchanged. Note that the low resolution signals obtained after act 301 are simply low resolution versions of the signals prior to act 301, and therefore the low resolution signals can be displayed in the normal manner, without any further processing, although the displayed pixel has a lower resolution than normal. Also note that resolution reduction, as described herein is different from compression because there is no packing of information into a smaller number of bits, and instead, information in the least significant bits is simply discarded.

Thereafter, graphics processor 300 performs one or more acts (as illustrated by act 302 in FIG. 3A) on the low resolution signals, e.g. transmits the signals or stores the signals. Next, graphics processor 300 generates an enhanced (e.g. 24 bit) resolution signal by enhancement (as illustrated by act 303 in FIG. 3A) of the corresponding low resolution signal by use of the unchanged multisample signal. Then, graphics processor 300 displays (as illustrated by operation 210 described above in reference to FIG. 2B) on screen 101 a pixel, e.g. by averaging the multisample signals and storing them in a frame buffer.

In case of an interior pixel 221I, each of multisample signals A–D are identical to each other prior to resolution reduction (see act 301). So each enhanced resolution signal is exactly identical to the corresponding high resolution signal prior to reduction of resolution. Specifically, multisample signals obtained by enhancing resolution are exactly correct because each of signals A–C are identical to signal D, and there is no loss of information during resolution reduction and enhancement (as described above in reference to acts 301 and 303) for interior pixel 221I. Therefore, graphics processor 300 displays on screen 101 interior pixels 221A–221P at the maximum resolution (e.g. 24 bits).

In the case of an edge pixel 222A (FIG. 2A) that is only partially covered by graphics primitive 208, graphics processor 300 changes at least one multisample signal (e.g. signals for locations A and B) to the color of graphics primitive 208 (assuming primitive 208 is opaque). At the same time, graphics processor 300 keeps at least one multisample signal (e.g. signal for locations C and D) for edge pixel 222A unchanged. Pixel 222A being covered by the edge of primitive 208 causes processor 300 to change a predetermined number (e.g. 16) of most significant bits of multisample signals A and B to become different from the corresponding bits of multisample signals C and D.

Any error in the least significant bits of signals A and B is similar to noise, and causes graphics processor 300 to display edge pixel 222A with the correct color (half the color of graphics primitive 208 and half the background color, hereinafter "50—50 mix") only at the lower resolution (e.g. 16 bits). After resolution enhancement, the least significant bits of signals A and B have the same value as the least significant bits of signal D, and therefore the averaged signal (at the maximum resolution) is not exactly the 50—50 mix (i.e. not the correct color), but has a little more of the background color due to the least significant bits (i.e. the averaged signal approximates the 50—50 mix). Note that at the lower resolution (e.g. 16 most significant bits), the averaged signal is exactly the 50—50 mix (i.e. the correct color).

As before, graphics processor 300 displays (as illustrated by operation 210 in FIG. 3A) the averaged signal at the maximum resolution (e.g. 24 bits). However, the human eye cannot see the error in the least significant bits, e.g. because pixel 222A is covered by an edge 208E in displayed image 220, and errors in resolution at such junctions of one or more triangles are imperceptible to the human eye. Therefore the error introduced by resolution reduction and enhancement as described herein does not result in any visible artifacts in image 220. So, resolution reduction and enhancement as described herein results in correct color at the maximum resolution for interior pixel 221I, and an approximate color (correct only up to the low resolution) for edge pixel 222J. Therefore, the effective resolution of multisample signals A–D of pixels 221A–221P and 222A–222R is non-uniform at the edges of image 220, and uniform in the interior of image 220.

Note that graphics processor 300 does not perform any acts differently for an edge pixel 222A as compared to an interior pixel 221A. Instead, the (1) dropping of any predetermined number of bits to obtain a low resolution signal, (2) supplementing with the predetermined number of bits of an unchanged high resolution signal to obtain an enhanced resolution signal and (3) displaying an image using the enhanced resolution signal in the normal manner automatically results in an interior pixel being displayed at the high resolution and an edge pixel being displayed at an effectively lower resolution.

In the above-described embodiment, graphics processor 300 uses four multisample signals A–D for each of pixels 221A–221P and 222A–222R, wherein three signals A–C have their resolution reduced and enhanced. However, such a graphics processor 300 can use any number of multisamples, e.g. 8 multisamples or 16 multisamples. In one example, all three low resolution signals A–C are 16 bits wide and high resolution signal D is 24 bits wide, resulting in a reduction of 3 bytes of memory for storage of each pixel (a 1 KB reduction for a 32×32 pixel tile) as compared to storing each pixel at the maximum resolution. Similar savings are obtained in the number of lines used to transmit pixels (i.e. the buses can be 3 bytes narrower). The just-described savings in storage (and transmission) of pixels are not limited to tiling architectures (wherein a graphics processor processes a tile at a time), but extend to any processor that stores and transmits pixels.

Low resolution signals A–C can have other widths than the 16 bit width illustrated in the above-described example. So, in another example, signal A is 16 bits wide, and signals B and C are both 12 bits wide, thereby to provide 1 additional byte reduction, as compared to the just-described example. That is, this example provides a reduction of 4 bytes of memory per pixel as compared to storage of a pixel at the maximum resolution. In yet another example, signal A is 16 bits wide, signal B is 12 bits wide, and signal C is 8 bits wide. In still another example, each of signals A–C is 12 bits wide. Furthermore, although multisample signal D is described in the examples as being maintained at maximum resolution, any of multisample signals A–C can be selected to be maintained as a high resolution signal instead of signal D.

Figure 3A:
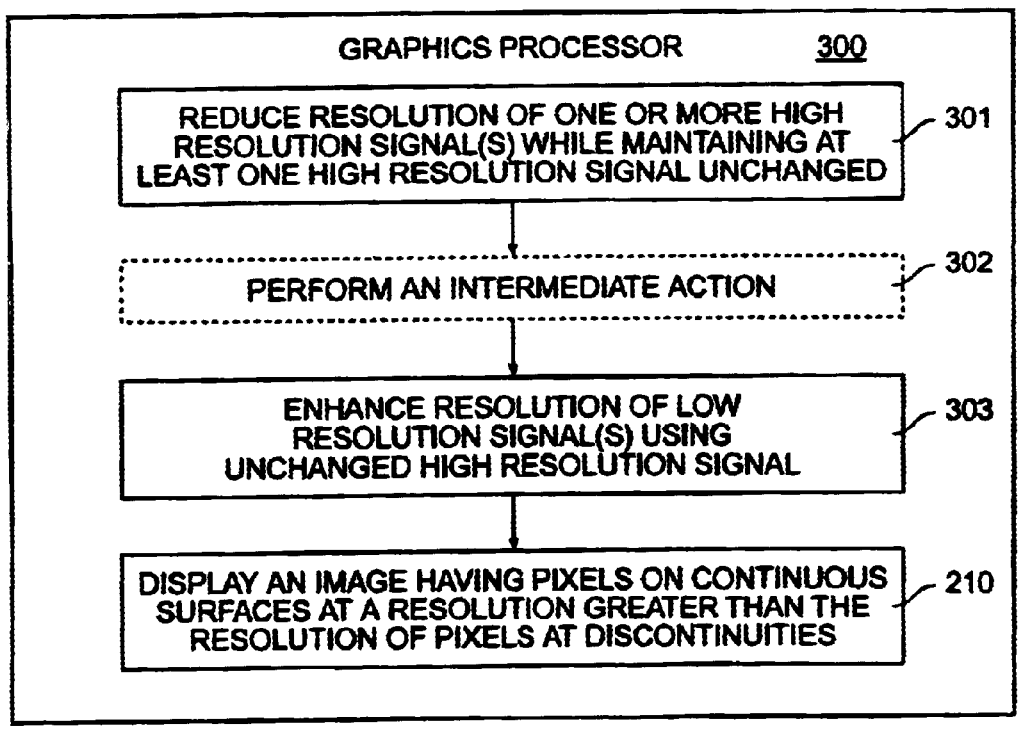
FIG. 3A illustrates, in a flow chart, one way of implementing the method illustrated in FIG. 2B.

Although acts 301 and 303 are illustrated in FIG. 3A as being performed inside a graphics processor 300, such acts can be performed in any processor (including graphics processor). One such processor 350 includes a resolution reducer 310 and a resolution enhancer 320 that work with each other to respectively reduce and enhance the resolution of a signal (and therefore the number of bits in the signal). Specifically, resolution reducer 310 has a number of input buses, including buses 311 and 312A–312Z (wherein $A \leq I \leq Z$, Z+1 being the total number of multisamples), and a corresponding number of output buses, including buses 314 and 313A–313Z. Each of buses 311, 312A–312Z and 314 has t lines and is referred to as a high resolution bus. Each bus 313I has i lines (wherein $a \leq i \leq z$) that are fewer than t lines, and is referred to as a low resolution bus.

Resolution reducer 310 reduces (as illustrated by act 301 in FIG. 3A) the resolution of an input signal on a high resolution bus 312I to generate an output signal on the corresponding low resolution bus 313I. In this embodiment, the signal on bus 313I has i bits that are exactly identical to the most significant i bits of the high resolution signal on bus 312I. Note that each of a . . . i . . . z (that may all be equal to each other) that denote the number of bits in the respective buses 313A . . . 313I . . . 313Z is less than t that denotes the number of bits in bus 314. When signals on buses 311 and 312A–312Z are identical to each other, signals on buses 313A–313Z can be simply replaced by the signal on bus 314 (by resolution enhancer 320) so that all signals on buses 323 and 322A–322Z are identical to each other. In other embodiments, the signal on bus 313I has i bits that are different from the most significant i bits of the high resolution signal on bus 312I, e.g. because the signal was mapped from a color space (such as the RGB space) to a lumina color difference space.

Figure 8A:
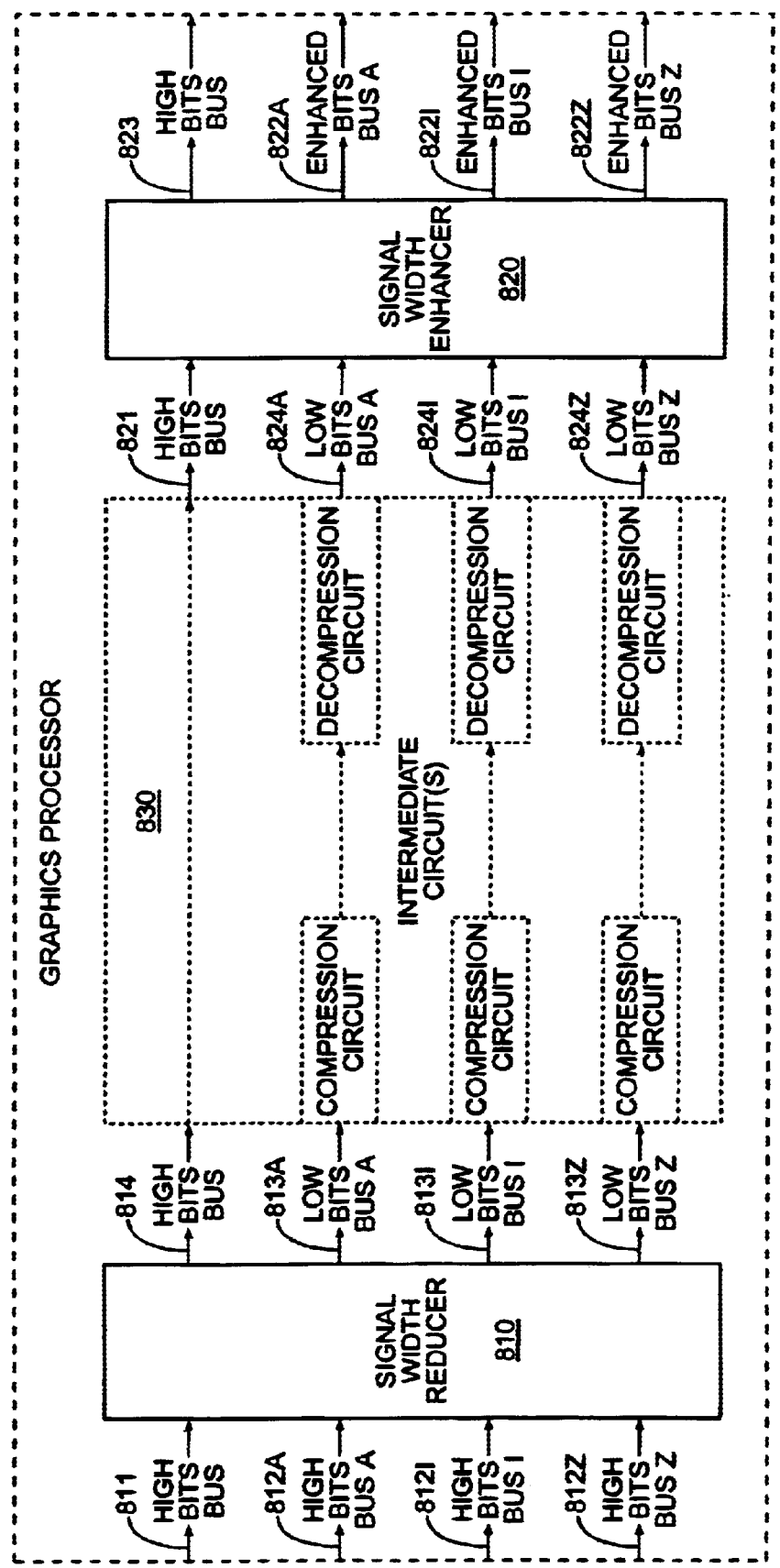
FIG. 8A illustrates, in a high level block diagram, a signal width reducer and a signal width enhancer in an alternative embodiment of the invention.
Figure 8B:
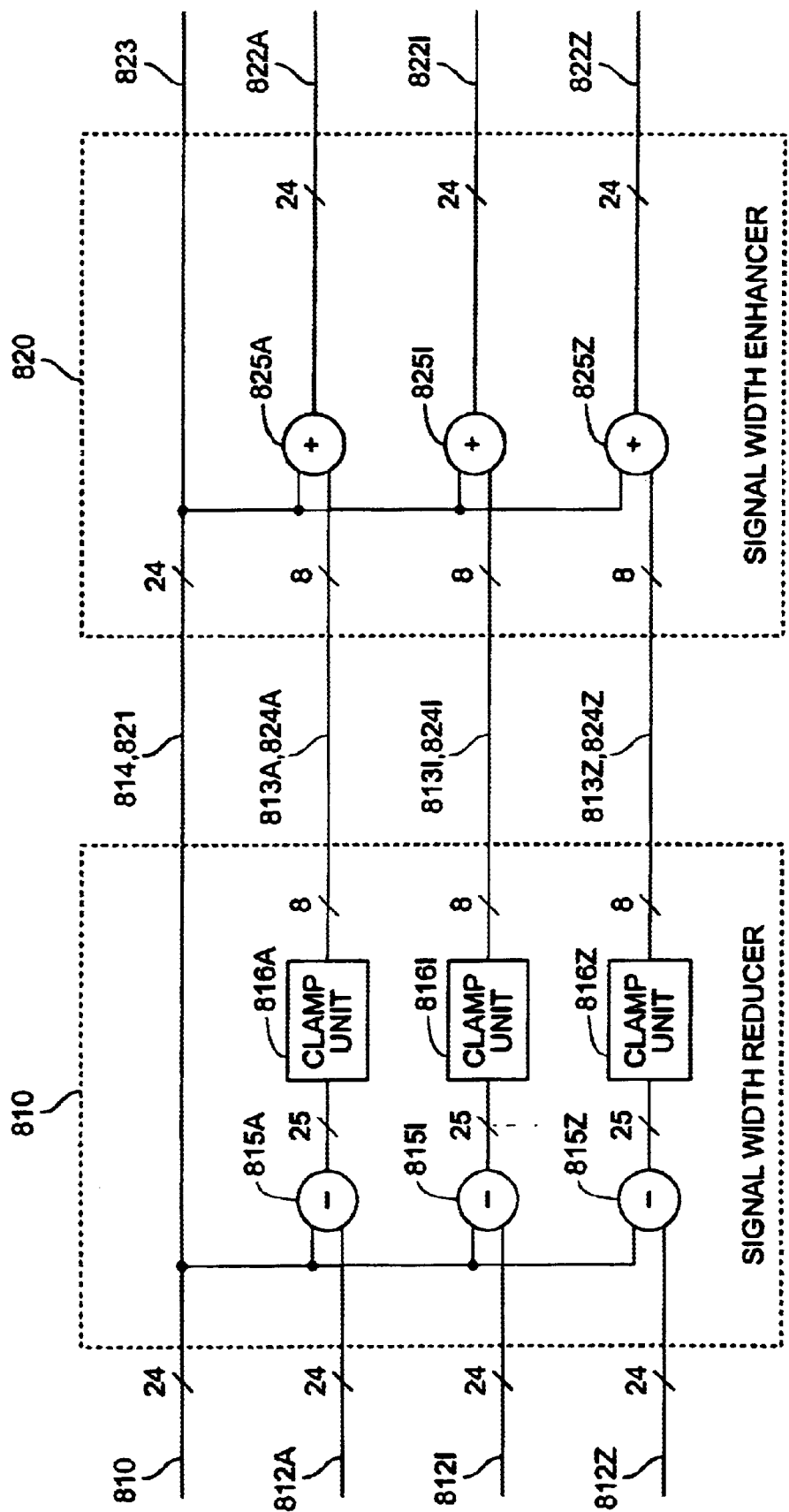
FIG. 8B illustrates, in a low level block diagram, one implementation of the signal width reducer and signal width enhancer illustrated in FIG. 8A.

Thereafter, one or more intermediate circuits 330 (FIG. 3B) in processor 350 perform various acts (such as storage and/or transmission; illustrated by act 302 in FIG. 3A) on the low resolution signal on bus 313I. In one embodiment, intermediate circuits 330 include a compression circuit that implements lossless compression (such as JPEG lossless compression described above) to compress a high resolution signal received from bus 314 and a decompression circuit to retrieve the high resolution signal that is supplied to bus 321. In alternative examples, intermediate circuits 330 also include one or more additional compression circuits (e.g. as described below in reference to FIG. 8A) that implement lossy compression or lossless compression (such as the JPEG lossy and lossless compressions described above) to compress one or more low resolution signals from buses 313A–313Z, and a corresponding number of decompression circuits that recover the low resolution signals and supply the recovered low resolution signals to buses 324A–324Z.

When lossless compression is used for the low resolution signals, there is no difference in the quality of a displayed image as compared to the embodiment that has no compression. When lossy compression is used for the low resolution signals, there is a degradation in the quality as compared to the uncompressed embodiment. Depending on the amount of degradation, such degradation may be acceptable because the degradation is limited to edge pixels (e.g. pixel 222A in FIG. 2A). Note that there is no degradation in the interior pixels (e.g. pixel 221A) even when lossy compression is used, if the loss of information occurs in bits that are replaced by bits of the high resolution signal.

Resolution enhancer 320 has a number of input buses, including bus 321 and buses 324A–324Z (wherein A$\leq$I$\leq$Z) and a corresponding number of output buses, including bus 323 and buses 322A–322Z. Each of buses 323, 322A–322Z and 321 has t lines. Each bus 324I has i (also called "second number") lines (wherein a$\leq$i$\leq$z) that are fewer than t (also called "first number") lines. Each bus 324I is also referred to as a low resolution bus, and each bus 322I is also referred to as an enhanced resolution bus. Resolution enhancer 320 (FIG. 3B) enhances (as illustrated by act 303) the low resolution signals received on buses 324A–324Z by use of the high resolution signal received on bus 321 to generate a corresponding number of enhanced resolution signals, each having t bits.

Processor 350 uses the enhanced resolution signals generated by resolution enhancer 320 on buses 322A–322Z in the normal manner. For example, graphics processor 300 displays (as illustrated by operation 210 in FIG. 3A) an image using the enhanced resolution signal, so that a pixel on a continuous surface is displayed at a resolution that is effectively greater than the resolution of an identical (or similar) pixel at a discontinuity.

Figure 3B:
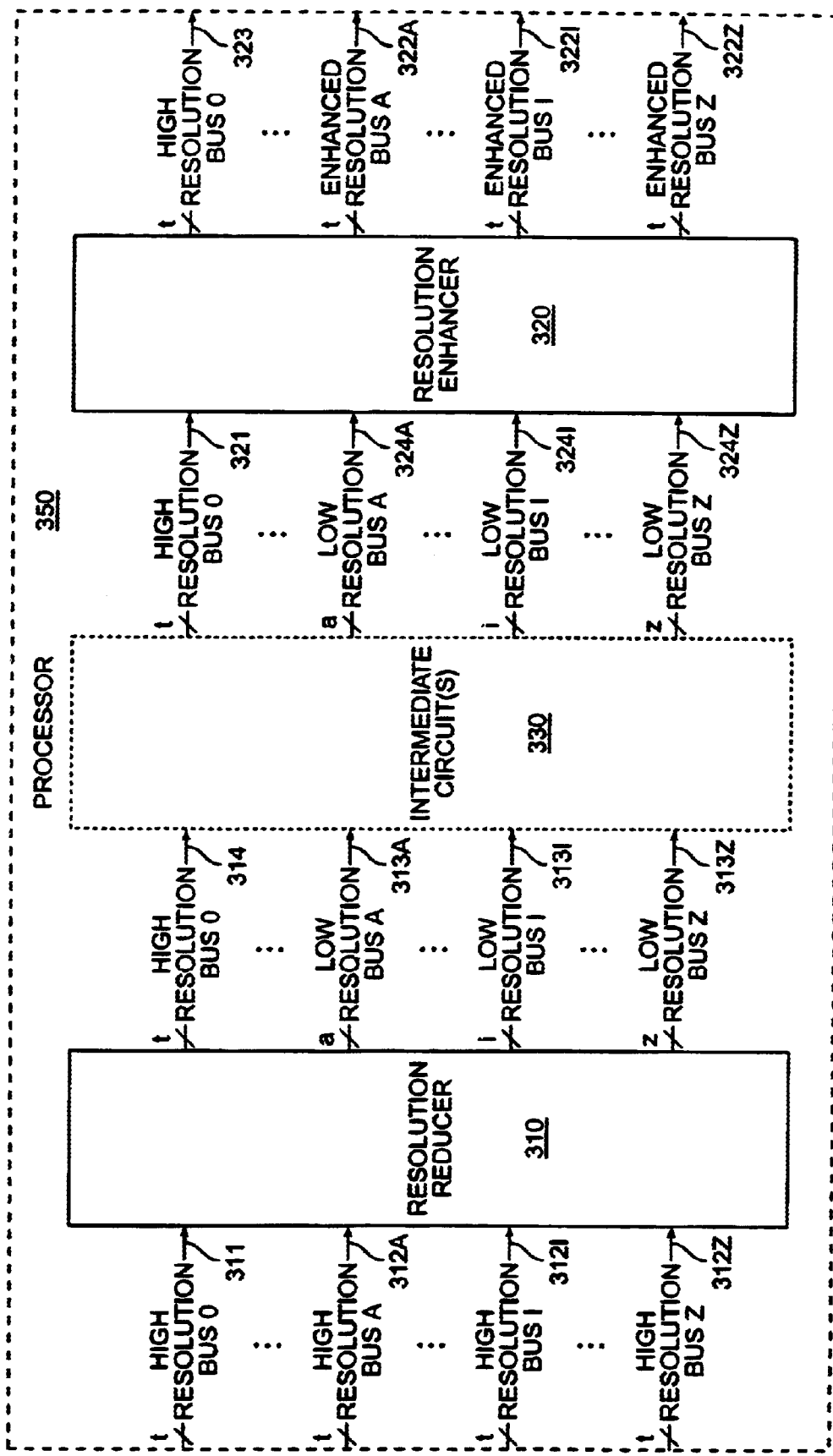
FIG. 3B illustrates, in a high level block diagram, a resolution reducer and a resolution enhancer in one embodiment of the invention.

Resolution reducer 310 is illustrated in FIG. 3B as having a number of high resolution buses 312A–312Z and 311 that are coupled to a device (not shown in FIG. 3B; also called "high resolution signal generator") that generates a corresponding number of high resolution signals. However, resolution reducer 310 and the high resolution signal generator can be integrated into a single device that generates signals of the same attribute but having different resolutions. Such integration reduces circuitry (by elimination of components that are required to generate the higher resolution), as discussed below in reference to blend stage 412 in FIG. 4A and in reference to probes used to generate scalar field samplings.

Figure 3C:
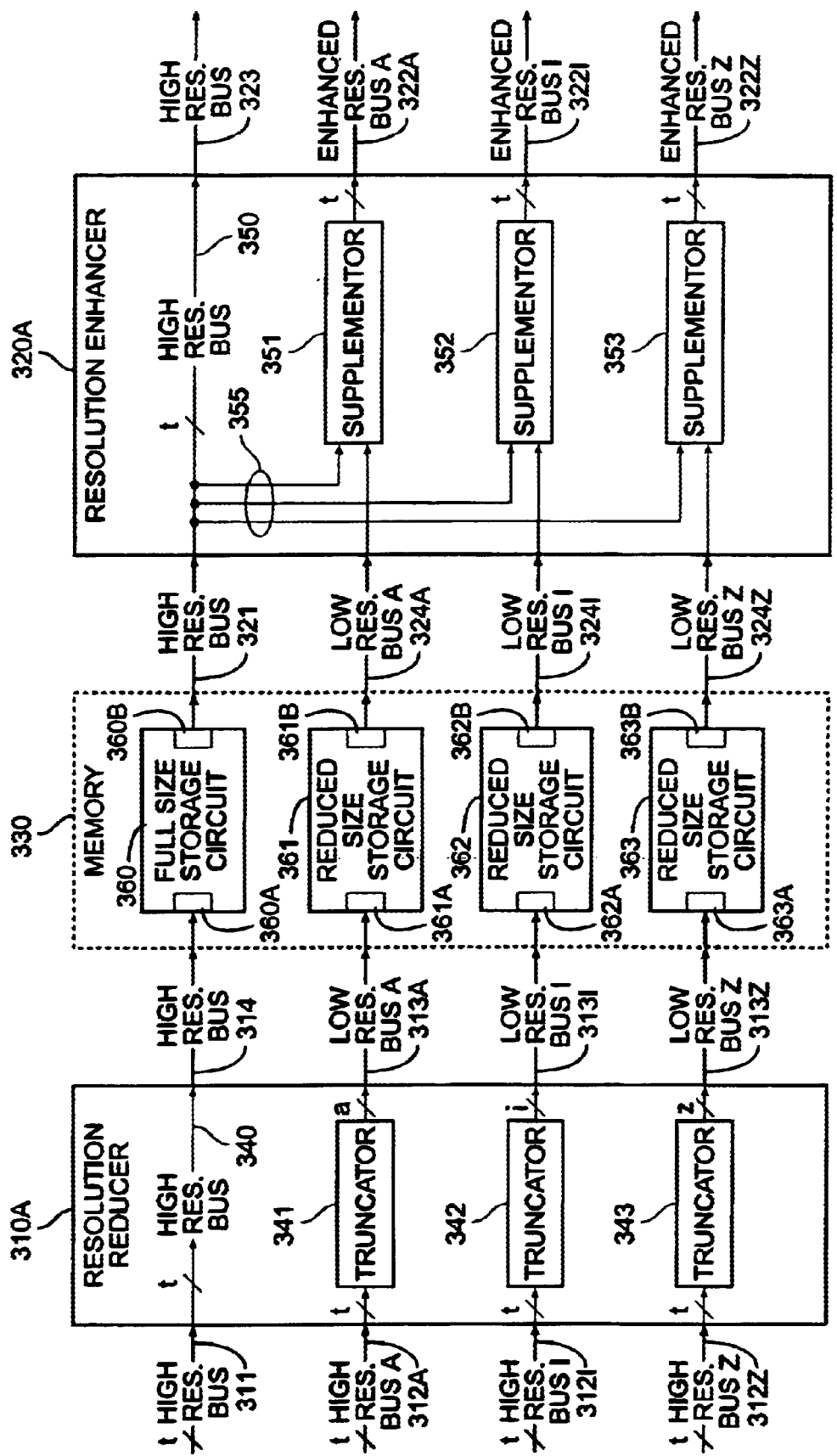
FIG. 3C illustrates, in an intermediate level block diagram, circuitry included in the resolution reducer, resolution enhancer and the intermediate circuits illustrated in FIG. 3B.

In one embodiment, a resolution reducer 310A (FIG. 3C) simply truncates one or more high resolution signals received on buses 312A–312Z (also called "second reducer input buses") while passing without change another high resolution signal received on bus 311 (also called "first reducer input bus"). Specifically, resolution reducer 310A includes a number of lines (also called "reducer lines") that are coupled to receive a high resolution signal from first reducer input bus 311 and pass the high resolution signal to bus 314. Moreover, resolution reducer 310A also includes a number of truncators 341–343 that are coupled to receive high resolution signals from second reducer input buses 312A–312Z and pass a low resolution signal to buses 313A–313Z. In one implementation, each of truncators 341–343 simply drops certain least significant bits of a high resolution signal to generate the low resolution signal, e.g. as described below in reference to FIG. 5A.

Moreover in this embodiment, intermediate circuit 330 (that is located downstream from resolution reducer 310A) is a memory having a number of storage circuits 360–363. Each of storage circuits 360–363 has input terminals (also called "storage input terminals") 360A–363A that are coupled to buses 314 and 313A–313Z (also called "storage input buses"). Each of storage circuits 360–363 also has output terminals (also called "storage output terminals") 360B–363B that are coupled to buses 321 and 324A–324Z (also called "storage output buses").

As buses 314 and 321 are high resolution buses, storage circuit 360 is a full size storage circuit that has sufficient number t (also called "first number") of storage locations to hold the high resolution signal. Moreover, as buses 313A–313Z and 324A–324Z are low resolution buses, the remaining storage circuits 361–363 need not have the first number of storage locations. Instead, each of storage circuits 361–363 is a reduced size storage circuit that may have only the number i (also called "second number") of storage locations required to hold the bits being received from the corresponding buses 313A–313Z. The second number may be constant across each of circuits 361–363 or may change for each of circuits 361–363, depending on the implementation.

In this embodiment, resolution enhancer 320A includes a number of lines (also called "first enhancer lines") 350 that are used to pass unchanged the high resolution signal from bus 321 to bus 323 (also called "first enhancer output bus"). Resolution enhancer 320A enhances the low resolution signals received from buses 324A–324Z by use of certain least significant bits of the high resolution signal, and supplies the enhanced resolution signals to the respective buses 322A–322Z (also called "second enhancer output buses"). Specifically, the resolution enhancer includes a number of supplementors 351–353 that include lines 355 (also called "second enhancer lines") that are coupled to the necessary number of least significant lines among lines 350 and also to the corresponding least significant lines in buses 322A–322Z. Supplementors 351–353 also include additional lines (not shown in FIG. 3C; also referred to as "third enhancer lines") that are coupled between buses 324A–324Z and buses 322A–322Z, e.g. as described below in reference to FIG. 5C.

In another embodiment, a resolution reducer 310C (FIG. 3D) includes mapping units 371–373 that are coupled upstream of truncators 341–343, so that bits are truncated after the mapping of incoming signals from buses 312A–312Z. Resolution reducer 310C also includes a mapping unit 370C that can be identical to units 371–373 and that is coupled directly between high resolution buses 311 and 314 (i.e., there is no truncator therebetween). Mapping units 371–373 can be designed to provide any mathematical transformation of the incoming signals. The mapped signals provided by mapping units 371–373 have a resolution m that is either same as t or less than t (depending on the mathematical transformation). Thereafter, truncators 341–343 are used in the manner described above in reference to FIG. 3C, to obtain the low resolution signal having "a" number of bits.

The mathematical transformation can be preselected to ensure that bits that have the least effect on the human visual system are discarded by truncators 341–343. Examples of such mathematical transformations are described in a book entitled "A Technical Introduction to Digital Video" by Charles A. Poynton (see Chapter 9, pages 171–184, incorporated by reference herein). In this embodiment, a resolution enhancer 320B includes a number of demapping units 380C and 381–383 that apply an inverse of the mathematical transformation that was applied by mapping units 370C and 371–373 respectively. In one example, each of mapping units 371–373 performs a logarithmic operation on the incoming signal so as to convert from a linear encoding to a logarithmic encoding. Later, each of demapping units 381–383 performs an exponential operation on the supplemented signals (provided by supplementors 351–353) to generate the enhanced resolution signals. Similarly, in this example, mapping unit 370C also performs the just-described logarithmic operation and demapping unit 380C also performs the just-described exponential operation (although other operations may be performed on a high resolution signal in other examples). Mapping units 370C and 371–373 may also convert a color signal to a lumina color difference signal as described below in reference to FIGS. 7A and 7B, so that the color difference portion is dropped, and the luminance portion is maintained at a high resolution.

Figure 3D:
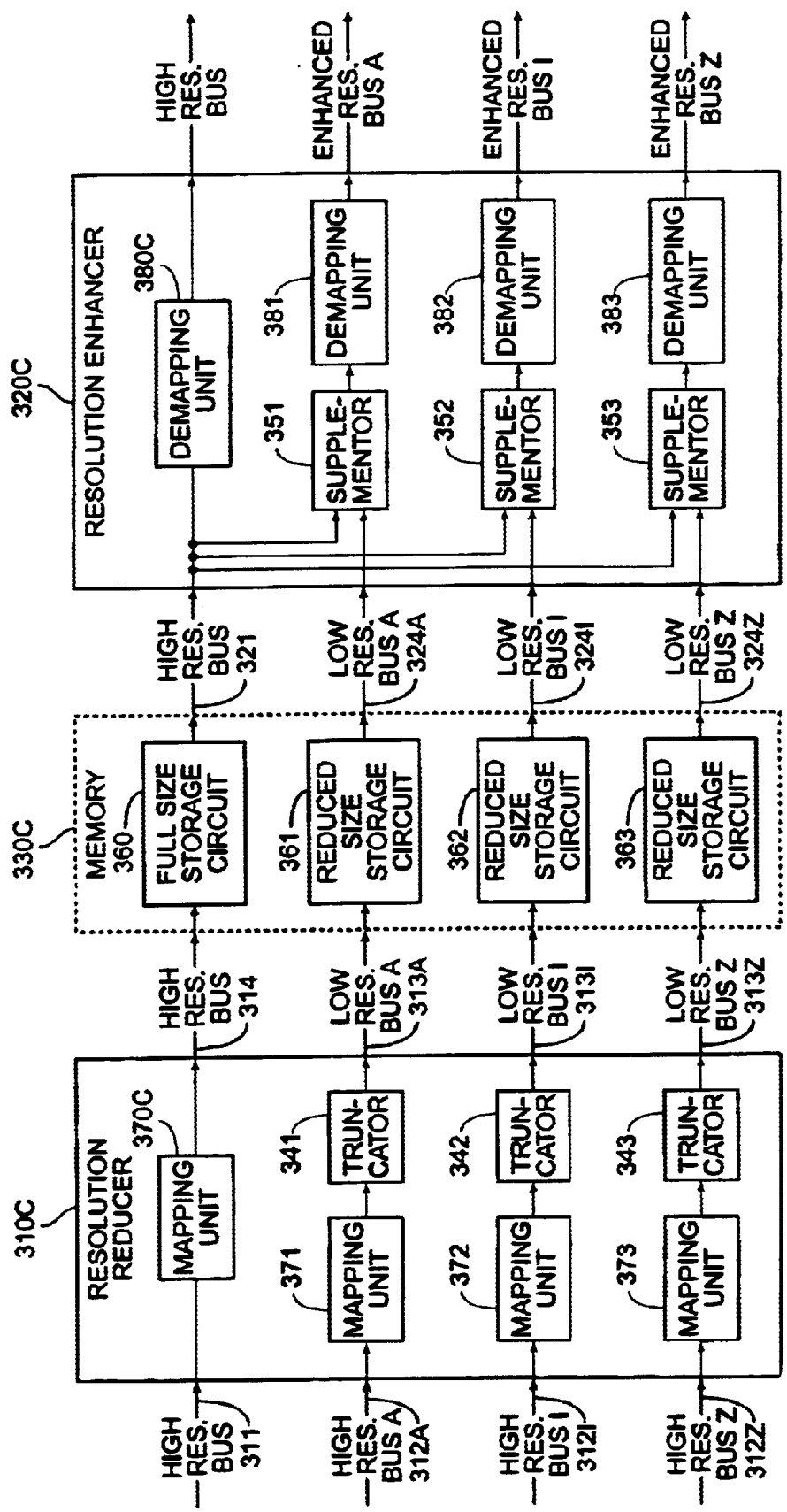
FIG. 3D illustrates an alternative variant of the embodiment illustrated in FIG. 3C.

As noted above, depending on the variant, the high resolution signal may or may not be mapped as illustrated by item 370C in FIG. 3D. Mapping of the high resolution signal may be advantageous if the mapping results in reducing the width of the signal, e.g. when a logarithmic operation is performed. A logarithmic encoding of the color signal allows bits that are less noticeable by the human visual system to be discarded. Such mapping of the high resolution signal reduces the number of locations required in full size storage circuit 360 to hold the high resolution signal (when mapped).

Figure 4A:
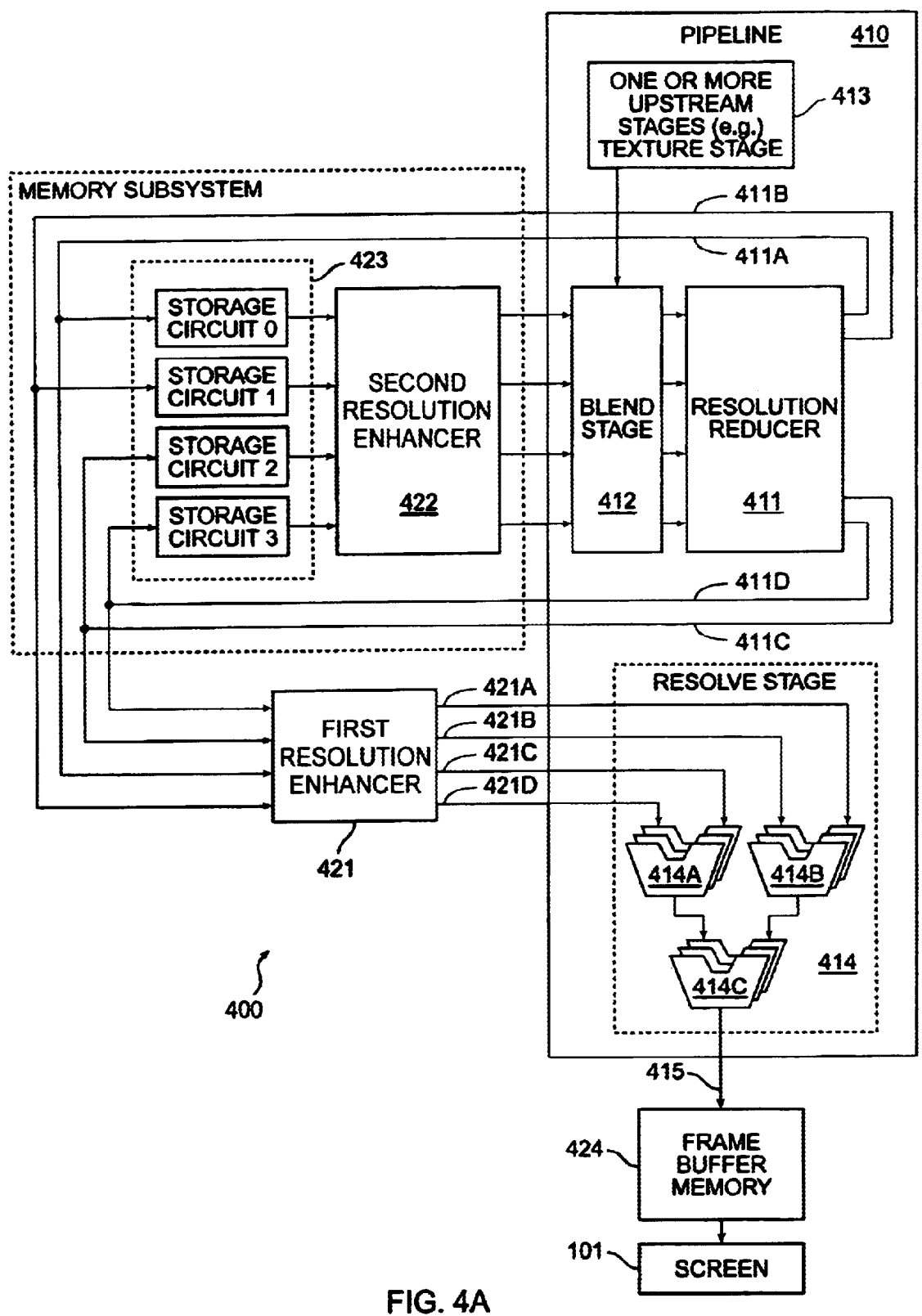
FIG. 4A illustrates, in a high level block diagram, a graphics processor that implements each of the methods of FIGS. 4B and 4C (below).
Figure 4B:
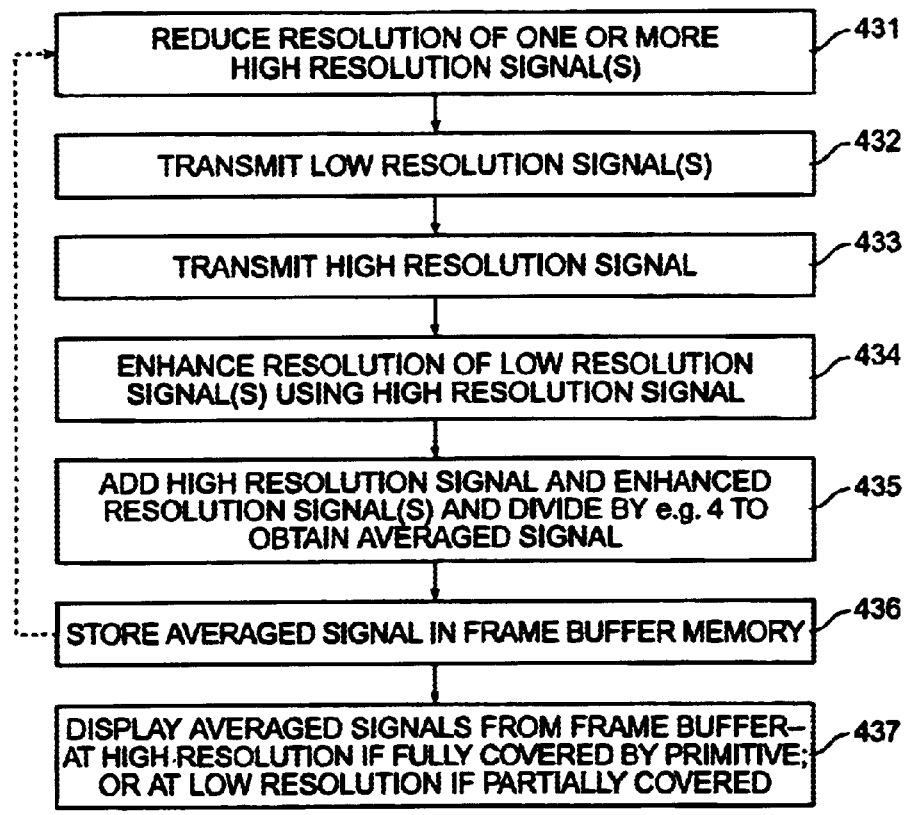
FIGS. 4B and 4C illustrate, in flow charts, alternative ways for implementing the method illustrated in FIG. 2B.

In one implementation, a graphics processor 400 (FIG. 4A) includes blend stage 412 that is coupled to a resolution reducer 411 to reduce the resolution (as illustrated by act 431 in FIG. 4B). Blend stage 412 in turn is coupled to receive high resolution signals from one or more upstream stages (such as a texture stage) 413 of a pipeline 410. The specific details of blend stage 412, and stages 413 are not critical aspects of this invention. For example, blend stage 412 can be implemented to provide the functionality described in the specification entitled OpenGL Programming Guide, The Official Guide to Learning OpenGL, Release 1, 1993, Addison-Wesley Publishing Company, Chapter 7, pages 196–201 that are incorporated by reference herein in their entirety.

Moreover, upstream stages 413 perform various rendering functions that may be required to generate a pixel from a graphics primitive. For example, stages 413 first determine a background color (e.g. grey) for a pixel 222A, and apply that color to all four multisamples A–D. Such rendering functions are not critical aspects of one embodiment of this invention. On receipt of a graphics primitive such as triangle 208 (FIG. 2A), blend stage 412 (FIG. 4A) changes the color for just the multisamples A and B to be the same color (e.g. red) as primitive 208, while multisamples C and D remain at the same background color (e.g. grey). In the just-described example, resolution reducer 411 reduces the resolution (e.g. by dropping the 8 least significant bits) of each of multisamples A–C while maintaining multisample D at the maximum resolution.

Processor 400 also includes two resolution enhancers 421 and 422. Resolution enhancer 421 is coupled to resolution reducer 411 by a number of buses 411A–411D that transmit (as illustrated by acts 432 and 433 in FIG. 4B) signals therebetween. Note that although acts 432 and 433 are illustrated in FIG. 4B as being performed in a specific sequence, such acts can be performed in any sequence, e.g. simultaneously. Resolution enhancer 421 (also called "first resolution enhancer" or "transmission resolution enhancer") enhances resolution of low resolution signals after their transmission (as illustrated by act 434) by supplementing them with low order bits from the high resolution signal. Note that in this embodiment there is no intervening circuitry between transmission resolution enhancer 421 and resolution reducer 411, except for buses 411A–411D that perform the transmission.

Transmission resolution enhancer 421 has output buses 421A–421D that are coupled to a resolve stage 414 that includes a number of adders in sets 414A–414C. In the above-described example, transmission resolution enhancer 421 passes the 8 least significant bits of multisample D as the 8 least significant bits of multisamples A–C. So, pixel 222A has two multisamples C and D that are both the background color (e.g. grey), and two multisamples A and B that are primitive color (e.g. red) for the 16 most significant bits, and background color (e.g. grey) for the 8 least significant bits.

In this implementation, each of sets 414A–414C includes three adders that are not individually labeled for clarity. Two sets of adders 414A and 414B add (as illustrated by act 435 in FIG. 4B) signals from transmission resolution enhancer 421, and provide partial sums, for each color component (e.g. red, green, blue), to a set of output adders 414C. The set of output adders 414C add (also illustrated by act 435) the partial sums and divide the result by four (e.g. by truncation of the two least significant bits) to generate an averaged signal on an output bus 415. Output bus 415 is coupled to a frame buffer memory 424 that stores (as illustrated by act 436 in FIG. 4B) the averaged signal. The just-described acts 431–436 are repeated for each pixel in image 220 (FIG. 2A), and when all pixels are processed, frame buffer memory 424 provides the averaged signals to screen 101 for display (as illustrated by act 437 in FIG. 4B).

In the implementation illustrated in FIG. 4A, graphics processor 400 includes another resolution enhancer (called storage resolution enhancer) 422 (FIG. 4A) that is coupled to the output terminals of a memory 423 formed by a number of storage circuits 0–3 (such as static random access memories abbreviated as SRAMs). In one example of this implementation, storage circuit 3 has 24 bit wide storage locations for holding the maximum resolution (e.g. signals for colors red, green, and blue are each held in 1 byte, commonly referred to as "888" encoding), while storage circuits 0–2 have 16 bit wide storage locations (e.g. signals for colors red and blue are each held in 5 bits and a signal for color green is held in 6 bits, commonly referred to as "565" encoding).

Buses 411A–411D are also coupled to input terminals 423A–423D of memory 423, so that low resolution signals from resolution reducer 411 can be stored (as illustrated by acts 438 and 439 in FIG. 4C) in memory 423. The signals in memory 423 are retrieved (as illustrated by acts 440 and 441) when necessary and passed to resolution enhancer 422 (also called "second resolution enhancer" or "storage resolution enhancer"). Therefore, storage resolution enhancer 422 enhances resolution (as illustrated by act 442) of the low resolution signals after retrieval from storage, whenever memory 423 is read. Storage resolution enhancer 422 is coupled to the output terminals of memory 423 and operates only after the low resolution signals are stored in memory 423 and retrieved therefrom.

Figure 4C:
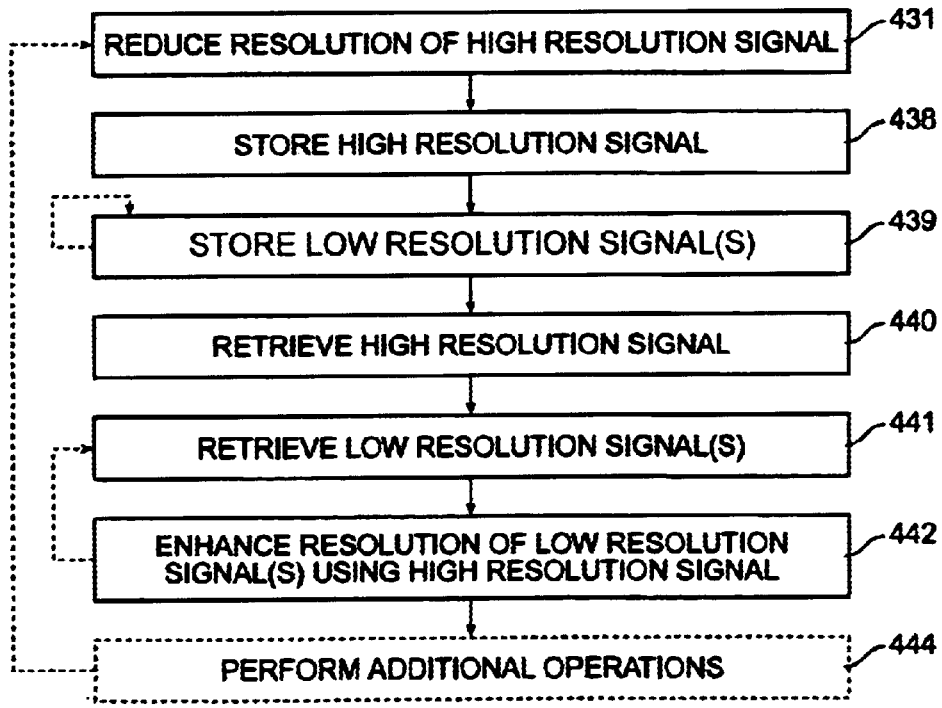

In one embodiment, the pair of acts 438 and 439 are performed simultaneously while the pair of acts 440 and 441 are also performed simultaneously, although these acts are illustrated in FIG. 4C as being performed sequentially. In the above described example, when a pixel is retrieved from memory 423, the 16 bit signals from each of storage circuits 0–2 are enhanced by resolution enhancer 422 to 24 bit signals by concatenating the retrieved signals with the 3 least significant bits of each of red and blue colors and the 2 least significant bits of the green color from the 888 encoded 24 bit signal retrieved from storage circuit 3.

Use of two identical resolution enhancers 421 and 422 as described herein reduces both transmission lines and memory size, and yet allows graphics processor 400 to generate an image that does not have any noticeable artifacts. Although memory 423 is illustrated in FIG. 4A as being organized in a particular structure (e.g. storage circuit 0 storing all subsamples A) and implemented in a particular manner (e.g. as an SRAM), any other structure and implementation can be used in other embodiments. For example, memory 423 can be off chip, in a dynamic random access memory (DRAM), or can be on chip in the form of buffers, latches, or DRAMs.

In one embodiment, a resolution reducer 510 (FIG. 5A) simply drops a number of least significant bits of a high resolution signal received on an input bus 312I to generate a low resolution signal on an output bus 313I. Specifically, resolution reducer 510 receives a high resolution signal (from bus 311) and simply passes (as illustrated by act 511 in FIG. 5B) the signal unchanged to bus 314. Resolution reducer 510 (FIG. 5A) also receives an additional high resolution signal (as illustrated by act 512 in FIG. 5B) from a bus 312I and passes, as the corresponding low resolution signal on bus 313I, only a portion (i.e. only i bits) of the respective high resolution signal.

Figure 5A:
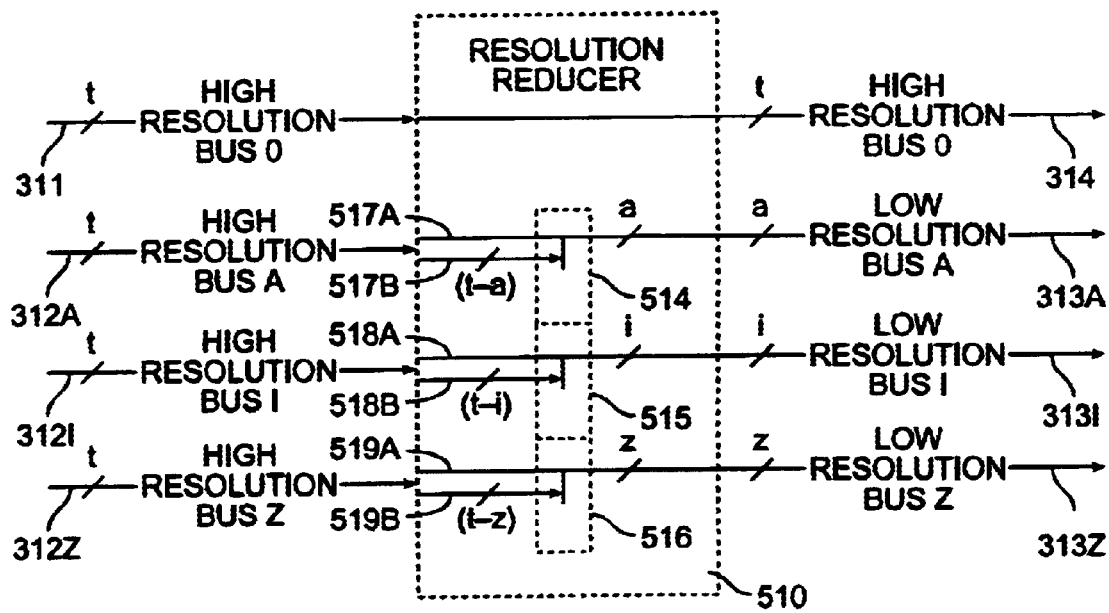
FIGS. 5A and 5C illustrate, in low level circuit diagrams, a resolution reducer and a resolution enhancer respectively.
Figure 5B:
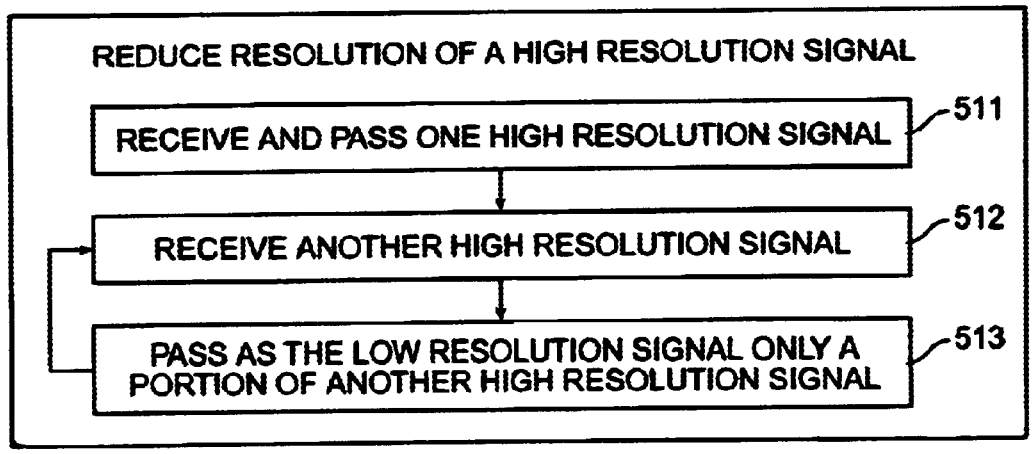
FIGS. 5B and 5D illustrate, in flow charts, processes for reducing and enhancing the resolution of signals.
Figure 5C:
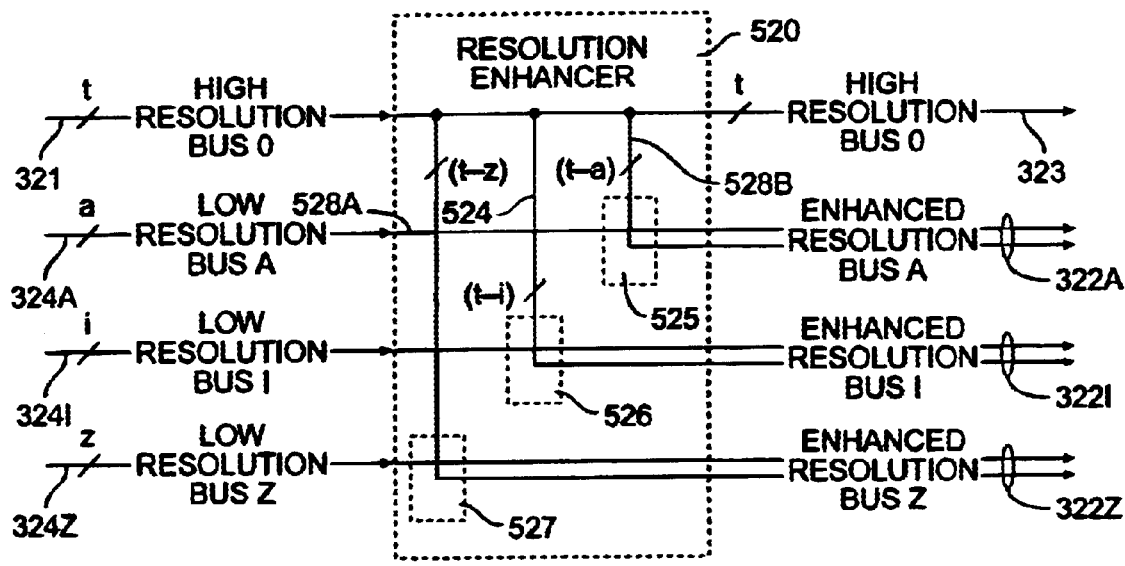

In the implementation shown in FIG. 5A, each of truncators 514–516 is implemented as follows: only i lines (for the i most significant bits) of high resolution bus 312I are coupled to low resolution bus 313I, and (t–i) lines (for the t–i least significant bits) are left uncoupled or unutilized. Note that in other embodiments, a resolution reducer need not receive the high resolution signal, as the signal is not used.

Figure 5D:
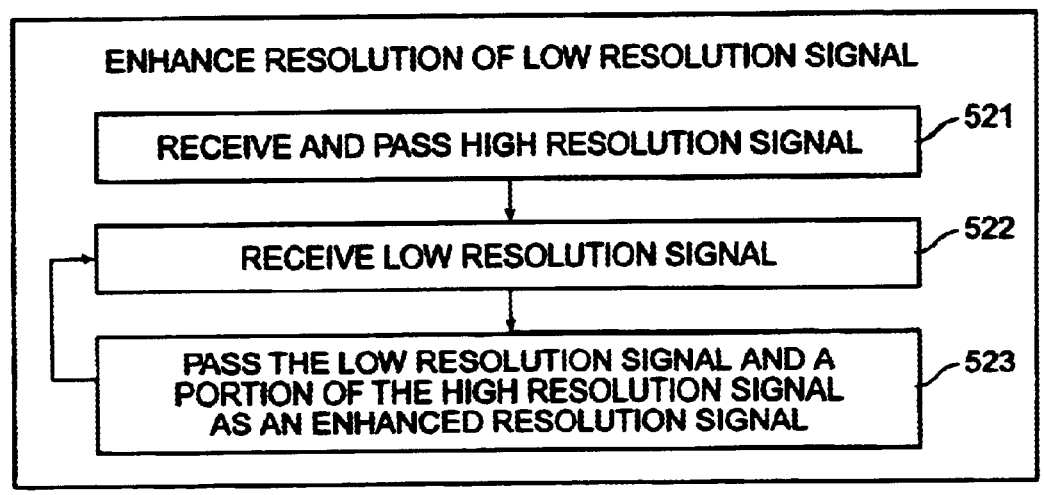

In this embodiment, resolution enhancer 520 (FIG. 5C) receives a high resolution signal (from input bus 321) and passes. (as illustrated by act 521 in FIG. 5D) the signal unchanged to an output bus 323. Resolution enhancer 520 also receives, in addition to the just-described high resolution signal, a low resolution signal (as illustrated by act 522 in FIG. 5D) from another input bus 324I. The high resolution signal on bus 321 is normally stored or transmitted with the low resolution signal on bus 324I. In one embodiment, each of supplementors 525–527 in resolution enhancer 520 passes (as illustrated by act 523 in FIG. 5D), as the corresponding enhanced resolution signal on bus 322I, i bits from the received low resolution signal and in addition passes (also illustrated by act 523 in FIG. 5D) a portion (i.e. t–i least significant bits) of the high resolution signal received from bus 321.

Therefore, the enhanced resolution signal is merely a concatenation (obtained by simply passing the to-be-concatenated signals to lines in the enhanced resolution bus) of the low resolution signal and a portion of the high resolution signal that together form the enhanced resolution signal. In the implementation shown in FIG. 5C, i lines of low resolution bus 324I are coupled to i lines in enhanced resolution bus 322I that carry the i most significant bits, and (t–i) lines of high resolution bus 321 are coupled to the (t–i) lines in enhanced resolution bus 322I that carry the (t–i) least significant bits.

Resolution enhancer 520 of this embodiment requires a high resolution signal to create the enhanced resolution signal. Therefore, at least one high resolution signal is left unchanged by the corresponding resolution reducer 510. Any one (or more) of the four multisample signals for locations A–D in pixel 222A (FIG. 2A) can be maintained as a high resolution signal. In one embodiment, two multisample signals are maintained as high resolution signals. In this embodiment, these two multisample signals are signals for two locations (e.g. locations A and D) that are selected to be diagonally opposite to each other (because the diagonally opposite locations are symmetric, and are separated by the greatest distance between any two locations).

Implementation of a resolution reducer 510 (FIG. 5A) and a resolution enhancer 520 (FIG. 5C) by simply dropping and concatenating as described herein requires just additional lines 524 (FIG. 5C) in resolution enhancer 520, and maintenance of a high resolution signal unchanged by resolution reducer 510. In such an implementation, each of resolution reducer 510 and resolution enhancer 520 is devoid of a logic element and also devoid of a storage element. Therefore, the hardware requirement for implementing such a resolution reducer 510 and a resolution enhancer 520 is several orders of magnitude lower than hardware required for implementation of a prior art method of compression and decompression.

Concatenation of least significant bits from the high resolution signal as performed by resolution enhancer 520 is better than just truncation or setting the least significant bits to zero, because concatenation ensures that the enhanced resolution signal is exactly the same as the high resolution signal prior to resolution reduction for all inside pixels 221A–221P (FIG. 2A). Although an error is introduced in the least significant bits of edge pixels 222A–222R resulting in an approximate color at a lower resolution, the error is imperceptible due to blending that occurs at each edge 208E. For example, when the background in image 220 has a color of value 0, and triangle 208 has another color of value 255, the exactly blended color value for pixel 222A is 128, but no artifacts can be noticed even if pixel 222A is displayed at color value 124, because such an approximation in the color value caused by lowering of resolution is imperceptible at a discontinuity.

The maximum lowering of resolution that is imperceptible at a discontinuity depends on a number of characteristics, such as the content of image 220, whether the sensor viewing image 220 is a human eye or a robotic camera, and the number of bits of resolution available in a screen 101 that displays image 220. For example, in one implementation, screen 101 is part of a workstation personal computer, and graphics processor 300 stores and/or transmits (in act 302 of FIG. 3A) a single 24 bit high resolution signal and three 16 bit low resolution signals. In another implementation (in a desktop personal computer), graphics processor 300 stores and/or transmits a single 24 bit high resolution signal and three 8 bit low resolution signals. In yet another implementation, screen 101 has a liquid crystal display (LCD) of a wrist watch, and graphics processor 300 stores and/or transmits a single 2 bit high resolution signal (wherein each of values 0–2 indicates one of colors red, green and blue and value 3 indicates depth—foreground/background), and a 1 bit low resolution signal (wherein the single bit indicates depth).

Figure 6A:
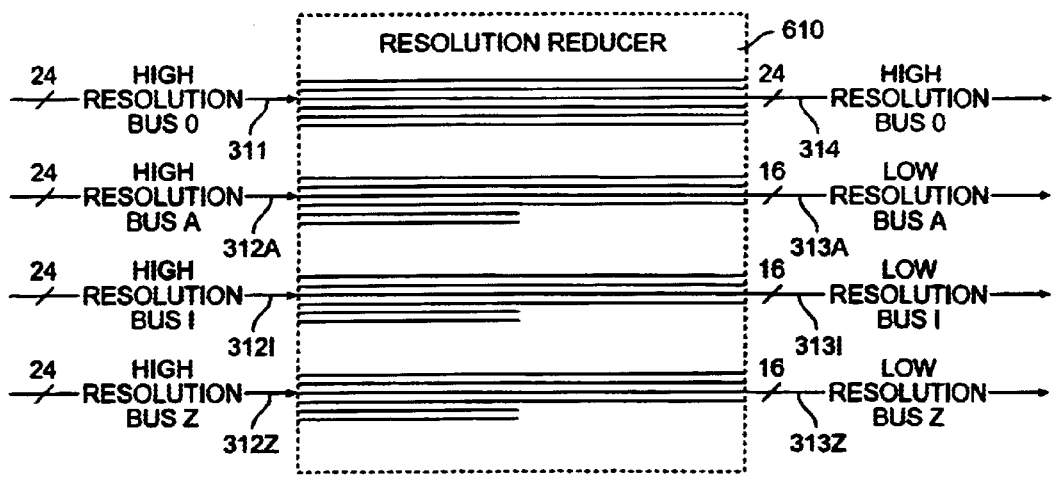
FIGS. 6A and 6B illustrate, in low level circuit diagrams, specific examples of a resolution reducer and a resolution enhancer respectively illustrated in FIGS. 5A and 5C.
Figure 6B:
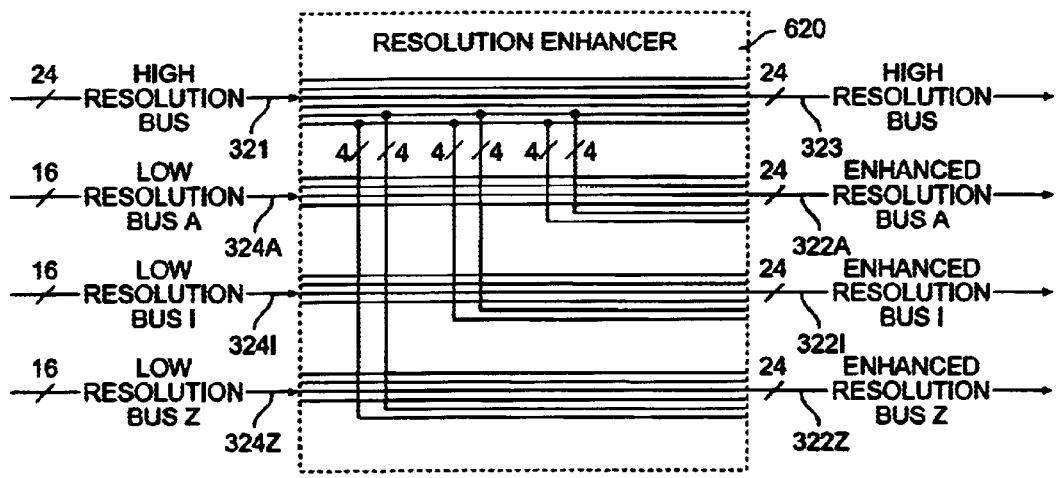

In one example, the high resolution signal is 24 bits wide, and each low resolution signal is 16 bits wide. Therefore, in this example, resolution reducer 610 (FIG. 6A) simply passes all 24 bits of the high resolution signal from bus 311 to bus 314, and only passes the 16 most significant bits from each of buses 312A–312Z to a corresponding one of buses 313A–313Z. Also, in this example, resolution enhancer 620 (FIG. 6B) passes all 24 bits of the high resolution signal from bus 321 to bus 323. Resolution enhancer 620 also passes all 16 bits of each low resolution signal from buses 324A–324Z to a corresponding one of buses 322A–322Z, and in addition passes 8 least significant bits of the high resolution signal as 8 least significant bits of each of buses 322A–322Z.

Figure 6C:
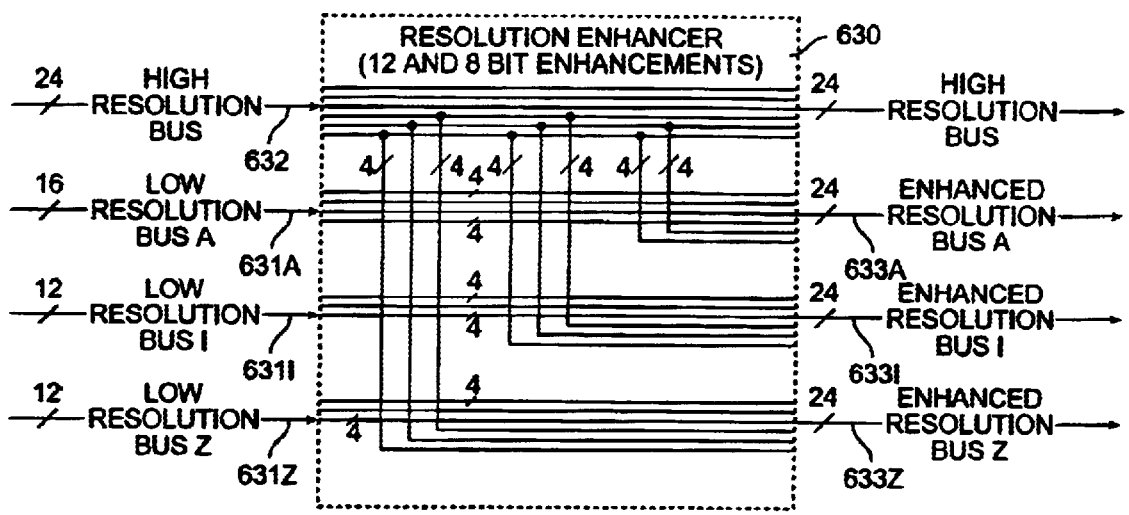
FIGS. 6C and 6D illustrate, in low level circuit diagrams, alternative examples of the resolution enhancer illustrated in FIG. 5C.
Figure 6D:
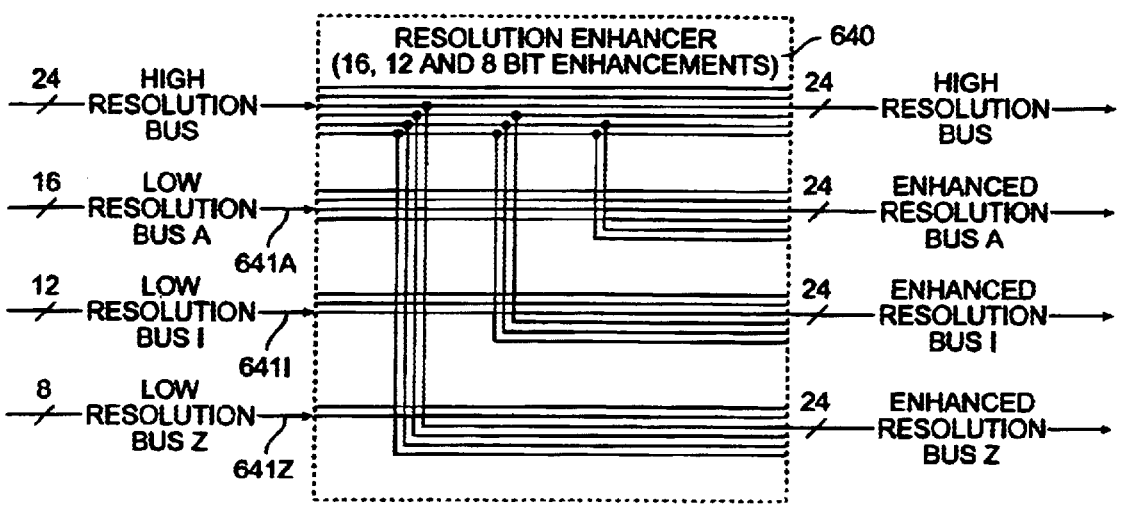

Note that the low resolution buses need not all have the same number of lines. In another example (illustrated by resolution enhancer 630 in FIG. 6C), two low resolution buses 631I and 631Z have the same number (in this example 12) of lines but a third low resolution bus 631A has a different number (in this example 16) of lines from the other two low resolution buses 631I and 631Z. As before, resolution enhancer 630 supplies a sufficient number of least significant bits from the high resolution signal on bus 632 to ensure that the enhanced resolution signals on buses 633A–633Z have the maximum resolution, e.g. 24 bits. So in the illustrated example, 8, 12 and 12 least significant bits are supplied from high resolution signal to the respective buses 633A–633Z.

In this particular example, the two low resolution buses 631I and 631Z carry multisample signals for diagonally opposite locations in a pixel 222A (FIG. 2A) for reasons described above. The reduction in the number of lines of the other two low resolution buses 631I and 631Z, from 16 illustrated in FIG. 6B to 12 illustrated in FIG. 6C results in additional savings in hardware, while allowing an image 220 to be displayed without any noticeable artifacts. Use of two or more different number of bits of low resolution (e.g. 16 bits and 12 bits) allows the maximum savings when having all low resolution buses of a first number of bits (e.g. 12 bits) results in artifacts and having all low resolution buses of a second number of bits (e.g. 16 bits) results in no artifacts.

In yet another example (illustrated by resolution enhancer 640 in FIG. 6D), each of low resolution buses 641A–641Z has a different number of lines from any other of buses 641A–641 Z, e.g. 16, 12 and 8 respectively. Resolution enhancer 640 still further reduces the required hardware as compared to resolution enhancer 630, because the total number of lines are reduced by 4. In still another example, the resolution reducer and enhancer are similar to the ones illustrated in FIGS. 6A and 6B, except that the low resolution buses have 12 lines each instead of 16, while the high resolution bus has 24 lines.

Figure 7A:
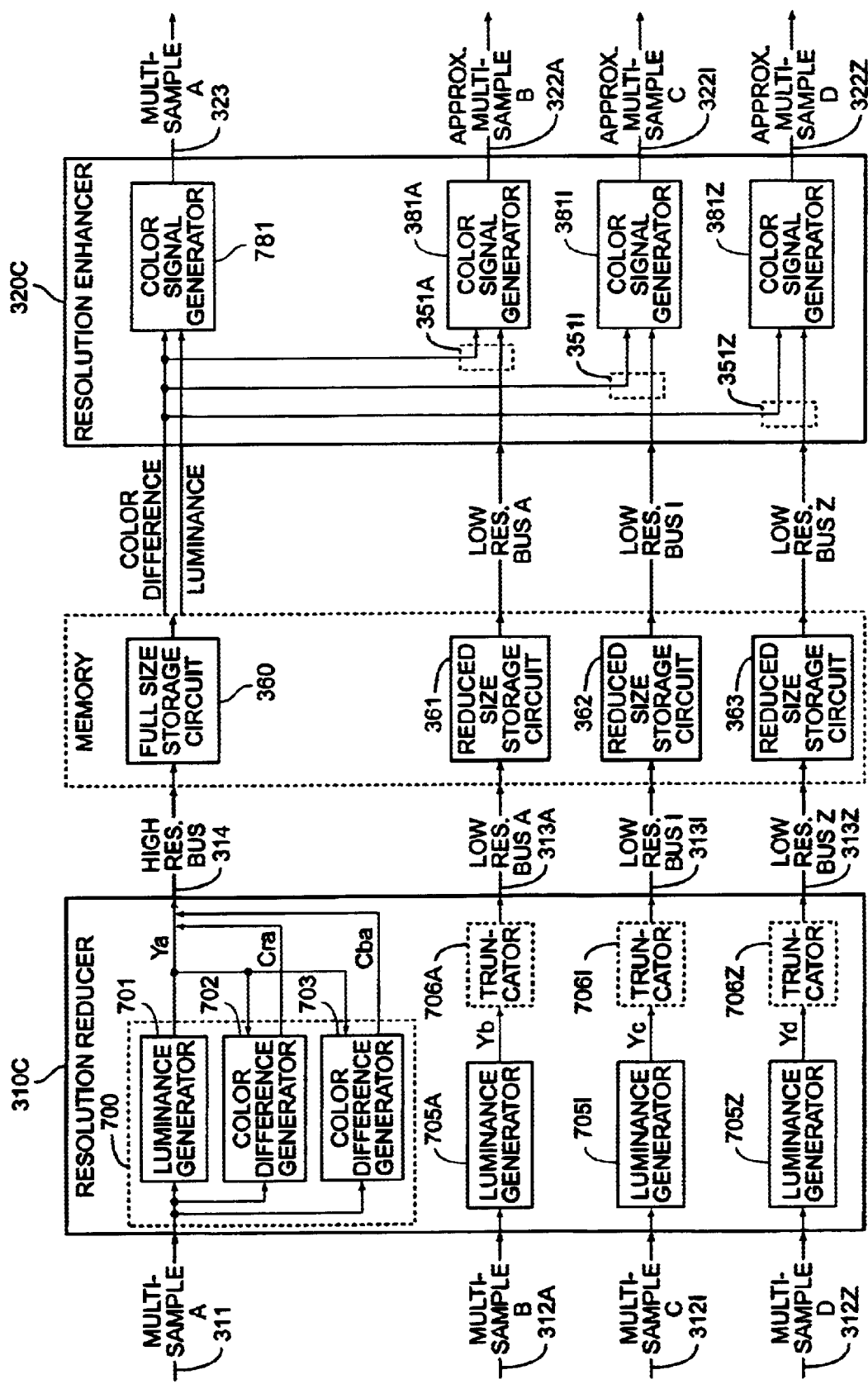
FIG. 7A illustrates, in an intermediate level block diagram, circuitry that forms a resolution reducer, a resolution enhancer and intermediate circuits in one embodiment of a graphics processor of this invention, as illustrated in FIG. 3D.

In one implementation of the embodiment described above in reference to FIG. 3D, mapping units 370C and 371–373 transform color signals to lumina color difference signals that are processed by intermediate circuits, and thereafter demapping units 380C and 381–383 transform the lumina color difference signals back to color signals. Specifically, as illustrated in FIG. 7A, a resolution reducer 310C includes a mapping unit 370C that can be implemented by a YCrCb generator formed by a luminance generator 701 for generating luminance (i.e. brightness value) Ya for multisample signal A, and two color difference generators 702 and 703 for generating the color difference signals Cra and Cba both for multisample signal A. In this implementation, mapping units 371–373 (FIG. 3D) are implemented by luminance generators 705A–705Z and truncators 341–343 by truncators 706A–706Z. Similarly, resolution enhancer 320C includes color signal generator 781 (FIG. 7A) that implements demapping unit 380C (FIG. 3D) and color signal generators 381A–381Z (FIG. 7A) implement supplementors 351–353 (FIG. 3D) and demapping units 381–383 (FIG. 3D). Note that in this implementation (FIG. 7A), the supplementors 351–353 and demapping units 381–383 are not separable circuits but are integrated into the respective color signal generators 381A–381Z. In this implementation of mapping unit 370C (also called YCrCb generator), color difference generators 702 and 703 (FIG. 7B) include subtractors 702S and 703S that respectively receive the red and blue components R and B and subtract therefrom the luminance Y generated by the luminance generator 701. Subtractors 702S and 703S supply the result of subtraction to truncators 702T and 703T respectively. Also in this implementation, luminance generator 705I (FIG. 7C) implements the formula Y=(¼)R+(⅝)G+(⅛)B.

See page 173 of Poynton's book (incorporated by reference above) for a more accurate formula for luminance. Luminance generator 705I includes a shifter 751 that left shifts the red value by 1 bit (a multiply by 2), another shifter 752 that shifts the green value left by 2 bits and adders 753–755 that add the shifted valued and the green and blue values. The result of additions is shifted right by 3 bits by truncator 706I (so that the final result is 8 bits). Note that instead of using a truncator 706I to discard the 3 least significant bits, the 11-bit result can be maintained and used to determine the pixel's color signal. The just-described formula is an approximation of how the human eye responds to these three components of the color signal. In this example, color difference signals Cr and Cb are generated by the following formulae: Cr=R-Y and Cb=B-Y, as described in reference to FIG. 7B.

In the illustration, each of signals R, G and B has 8 bits of resolution (also called "888" encoding), although other numbers of bits can be used in other examples. Luminance Ya obtained from the just-described formula has 11 bits, of which 3 bits can be dropped to obtain 8 bits. Other examples for generating such signals (i.e. luminance and color difference signals) are well known in the art, as described for example, in the above-referenced book "A Technical Introduction to Digital Video" (see Chapter 8, pages 155–170).

Figure 7B:
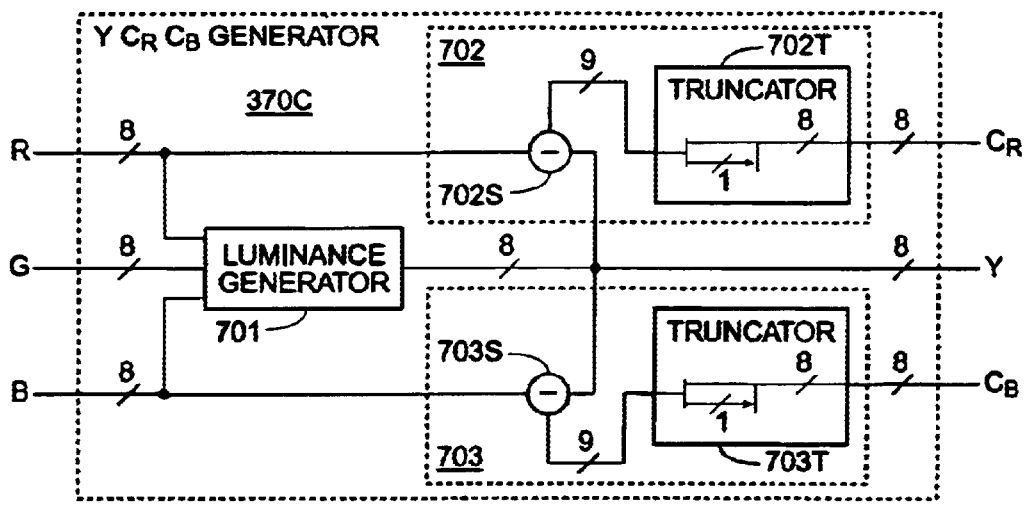
FIGS. 7B–7D illustrate, in low level block diagrams, circuitry included in a YCrCb generator, a luminance generator illustrated in FIG. 7A.
Figure 7C:
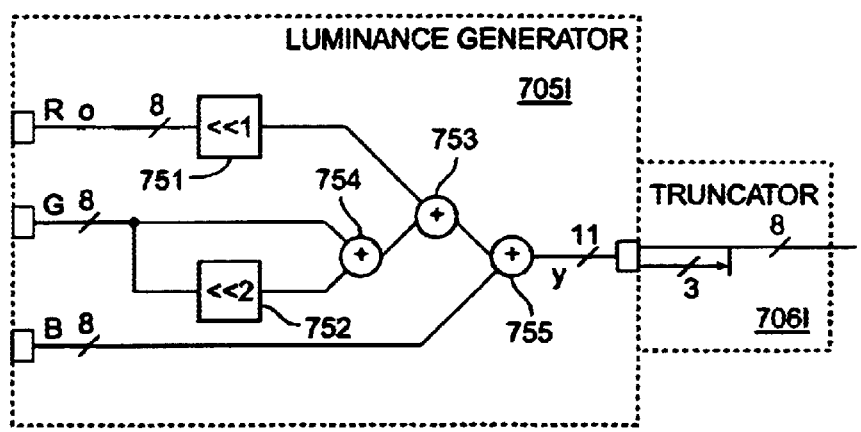
Figure 7D:
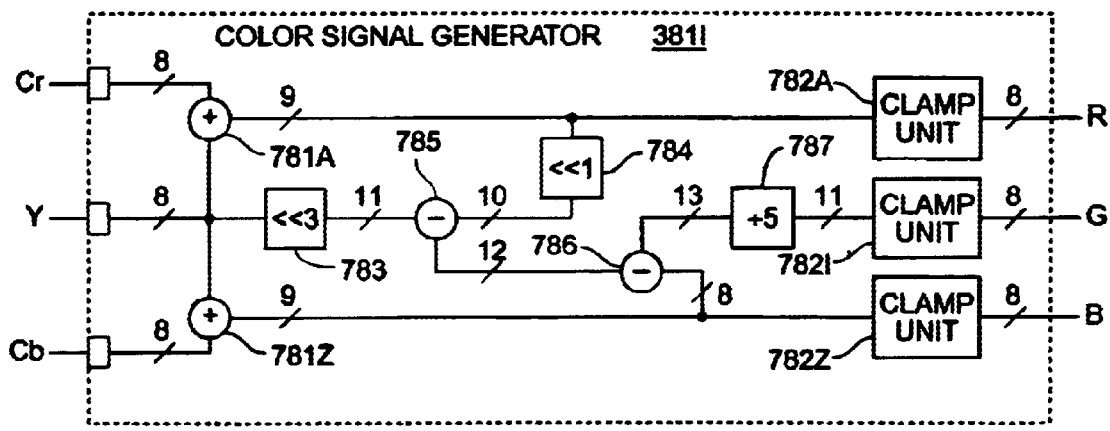

Source code in the C language for modeling the embodiment illustrated in FIG. 7B is provided below:

```
// the below software implements mapping units and truncators
// ms_clr[0] is the high resolution signal (multisample)
// ms_clr[1 .. NUMBER_OF_MULTISAMPLES] are the input signals
// lum[1 .. NUMBER_OF_MULTISAMPLES] are
the output luminances
// RGB to LUM is approximated via 1/4 R + 5/8 G + 1/8 B
#define RGB2LUM(c) \
( \
    (((c) ->r) << 1) + \
    (c) ->g + \
    (((c) ->g) << 2) + \
    (c) ->b) >> 3 \
)
int r, g, b, lum[NUMBER_OF_MULTISAMPLES];
for (i = 1; i < NUMBER_OF_MULTISAMPLES; ++i)
    lum[i] = RGB2LUM( &ms_clr[i] );
// the software below implements demapping units
// and supplementor
// lum0 is the luminance of the high resolution signal
// avglum is the average of all luminances
int lum0 = RGB2LUM( &ms_clr[0] );
int avglum = lum0;
```

-continued

```
for (i = 1; i < NUMBER_OF_MULTISAMPLES; ++I)
    avglum + = lum[i];
int d = avglum / NUMBER_OF_MULTISAMPLES - lum0;
r = ms_clr[0].r + d;
g = ms_clr[0].g + d;
b = ms_clr[0].b + d;
// clamp the output color
if (r < 0) r = 0; else if (r > 0xff) r = 0xff; clr.r = r;
if (g < 0) g = 0; else if (g > 0xff) g = 0xff; clr.g = g;
if (b < 0) b = 0; else if (b > 0xff) b = 0xff; clr.b = b;
```

Therefore, for multisample signal A, the three signals Ya, Cra, and Cba are provided by unit 700 to bus 314 (FIG. 7A), and together form the signal that is stored in storage circuit 360. In this implementation, the color difference signals Cr and Cb for the three remaining multisample signals B–D are dropped, and only the luminance signals Yb, Yc and Yd are stored in respective storage circuits 361–363 (that have a reduced size for this reason). For efficiency reasons color difference signals Cr and Cb may not even be generated from the respective color signals. Specifically, as illustrated in FIG. 7A, only a luminance generator 705I is used to generate luminance Yi of a multisample signal I, and the color difference generators are eliminated because the color difference signals Cr and Cb are to be dropped. Luminance signals Yb, Yc and Yd generated by each of luminance generators 705A–705Z may be truncated by truncators 706A–706Z if necessary (i.e. truncators 706A–706Z are optional) and thereafter supplied to buses 313A–313Z.

Note that the luminance signals Yb, Yc and Yd that are stored are simply the brightness or grey scale values of the respective color signals, and therefore signals Yb, Yc and Yd can be displayed in the normal manner, without any further processing, although the displayed pixel has no color. When such a pixel is located at an edge in the image, the lack of color may not be noticed by the human eye.

Resolution enhancer 320C (FIG. 7A) includes a number of demapping units 381A–381Z that are implemented by color signal generators that regenerate a color signal when the three signals (lumina and two color difference) are provided. In this implementation, each color signal generator 381I regenerates the color signal from the signals retrieved from storage circuit 360. Color signal generators 381A–381Z use the color difference signals Cra and Cba of the high resolution signal for multisample A, and also use the luminance signals Yb, Yc and Yd from each of the respective storage circuits 361–363 to generate the color signals on the respective output buses 322A–322Z.

Color signal generator 381I (FIG. 7D) includes two adders 781A and 781Z that respectively receive the color difference signals Cr and Cb, and add thereto the luminance Y, and supply the sums to clamp units 782A and 782Z respectively. Color signal generator 381I also includes a shifter 783 that left shifts the luminance signal Y by three bits, and another shifter 784 that left shifts the red color signal R from adder 781A by one bit, and subtractor 785 that subtracts the two shifted signals, thereby to generate a signal supplied to subtractor 786. Subtractor 786 in turn subtracts therefrom the blue color signal B generated by adder 781 Z, and supplies the result to a divider 787 that divides the result by five and supplies the quotient to clamp unit 782I.

Figure 7E:
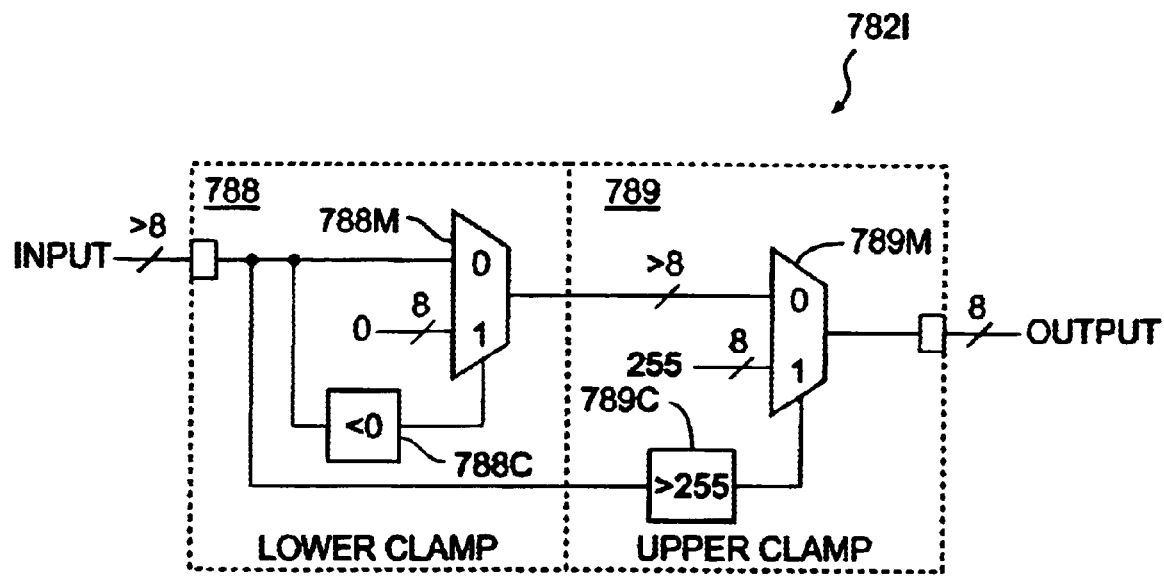
FIG. 7E illustrates, in a low level block diagram, circuitry included in each clamp unit illustrated in FIG. 7D.

Each of clamp units 782A–782Z is implemented as illustrated the components in FIG. 7E. Specifically, clamp unit 782I includes a lower clamp 788 that checks the input signal for underflow and upper clamp 789 that checks the input signal for overflow. Specifically, lower clamp 788 includes a comparator 788C that compares the input signal with the value zero, and if below the value zero drives an active signal to a multiplexer 788M. Multiplexer 788M selects a zero signal to be passed to the output signal when the control signal from comparator 788C is active. Similarly, upper clamp 789 includes comparator 789C that compares the input signal against the value 255, and if the input signal is greater than 255, comparator 789C drives a control signal active to multiplexer 789M. Multiplexer 789M in turn passes the signal of value 255 to the output signal when the control signal from comparator 789C is active, and otherwise passes the input signal to the output signal. Note that in the above-discussed clamp 782I, the input signal is normally a signal greater than eight bits, and therefore each of comparators 788C and 789C receives a signal having a width greater than eight bits. Multiplexers 788M and 789M together provide an output signal that is only eight bits wide.

The color signal on bus 323 (FIG. 7A) is identical to the color signal on bus 311 because no part of the signal was truncated. Dropping of the color difference signals Cr and Cb for multisamples B–D as described herein results in each of the signals on output buses 322A–322Z to have the same color. However, at an edge in an image the human eye is more sensitive to luminance than chrominance, and loss of color resolution is typically not noticeable at such edges. Depending on the application, instead of dropping the color difference signals entirely, one or more bits of the color difference signals may be generated and stored in storage circuits 361–363 for use by color signal generators 381A–381Z.

Figure 7G:
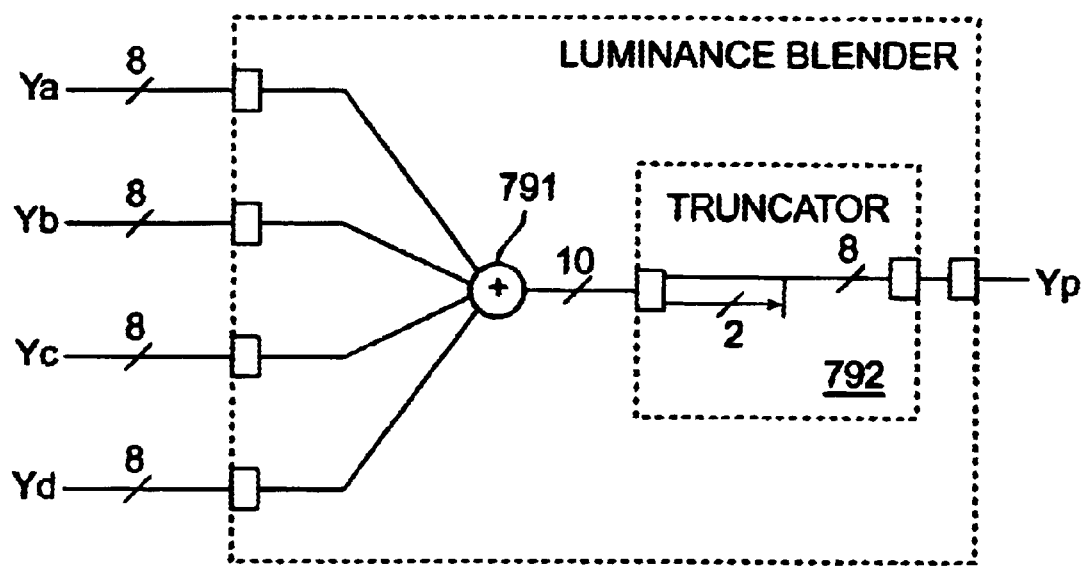
FIG. 7G illustrates, in a low level circuit diagram, a blender included in the circuit of FIG. 7F.

In one variant of the above-described implementation (FIG. 7A), the high resolution color signal of multisample signal A is stored directly (without conversion) into storage circuit 360 (FIG. 7F), i.e., without mapping unit 370C (FIG. 7A). On retrieval from storage circuit 360, a luminance generator 701 uses the high resolution color signal of multisample signal A to generate luminance Ya for the multisample A for use in blender 711. Blender 711 averages luminance signals Ya, Yb, Yc and Yd (by use of an adder 791 and truncator 792 as illustrated in FIG. 7G) to generate an average luminance signal Yp. As noted above, the luminance signal Y is preferred over chrominance signals CrCb because of the human eye's greater sensitivity to luminance as compared to chrominance.

Figure 7F:
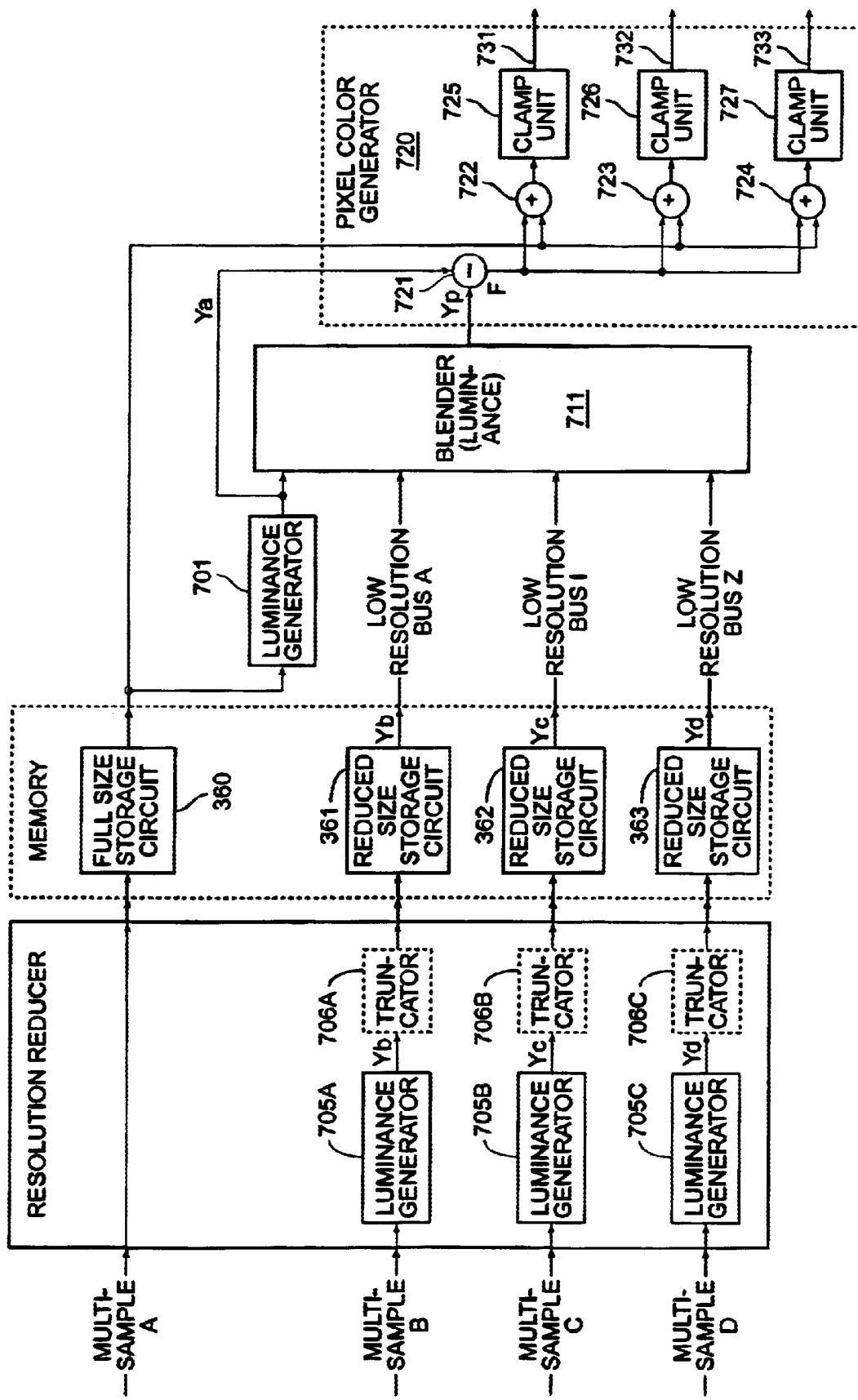
FIG. 7F illustrates, in an intermediate level block diagram, a variant of the circuit graphics processor of FIG. 7A that does not have a resolution enhancer.

Next, the difference between luminances Yp and Ya (respectively the average luminance and the luminance for multisample A) is determined and combined in a pixel color generator 720 (FIG. 7F) to generate the color signal for the pixel. Specifically, Ya is subtracted from Yp (by a subtractor 721) to generate a difference signal F that represents an adjustment in the A multisample's luminance to be in tune with the average luminance of the four multisamples A–D. The difference signal F is used with the high resolution color signal to generate three color components for the pixel's color signal, as illustrated in FIG. 7F.

Note that the pixel's color is not the correct color because the chrominance signals CrCb for multisamples B, C and D were not included in determining the pixel's color signal. Instead, the pixel's color is the color of just multisample A, with the luminance of multisample A being modified to be the correct average luminance for the pixel. In another embodiment, chrominance signals CrCb for only two multisamples, B and D, are discarded, so that the pixel's color signal has the color contributed by the other two multisamples, A and C. also, if there are eight multisamples, chrominance signals of four of the multisamples can be maintained. Moreover, the chrominance signals can be stored at a low resolution (e.g., even just 1 bit), to further reduce the memory required.

Therefore, antialiasing with resolution reduction and enhancement as described herein affects only the edges of surfaces and not the interiors. All four multisamples have the same luminance and chrominance values when a pixel is in the interior of a surface, and therefore the just-described computations result in the pixel having the correct color signal (i.e. the pixel's color signal remains unchanged although the chrominance signals of three multisamples are discarded and substituted with the chrominance signals of the fourth multisample).

When an edge has a large difference in luminance, the human eye is drawn to that edge, and the edge is very noticeable. In such a case, maintenance of the pixel's luminance is more important than maintenance of the pixel's chrominance. Therefore dropping the chrominance signals as described above in reference to FIGS. 7A–7C is superior to dropping least significant bits of the color signal components as described in reference to FIGS. 5A–5D.

In one embodiment, pixel color generator 720 (FIG. 7F) includes adders 722–724 that are coupled to receive signals from subtractor 721 and from storage circuit 360. In addition, pixel color generator 720 includes clamp circuits 725–727 that maintain the pixel's color signal in a valid range. Each of clamp circuits 725–727 provides on a corresponding one of output bus 731–733 one of the components (e.g. the red, green and blue components) of the color signal. Clamp circuits 725–727 are necessary (in this embodiment) to overcome inaccuracies in the pixel's color signal that are introduced by using the luminance formula (described in the next paragraph) that is an approximation of the correct formula. Note that in the embodiment illustrated in FIG. 7F, there is no resolution enhancer, and the signals from storage circuits 361–363 are used directly (without enhancement).

Although certain embodiments and implementations are described herein, numerous modifications and adaptations of such embodiments and implementations will be apparent to an engineer skilled in designing computers, in view of the disclosure. For example, instead of displaying an image on screen 101, a processor can use a method and/or a circuit described herein to print an image on paper, via a printer.

Moreover, instead of just multisamples of pixels in a graphics processor, such methods and circuitry can be used to reduce the hardware required to handle any redundant signals caused by flat spots in samplings of a scalar field (such as a two-dimensional array of values of a parameter, such as color, elevation or temperature). The scalar field samplings can be obtained, e.g. by n probes (wherein n>1) that are sampling a single parameter in any dimension scalar field, with at least one of the n probes generating a signal of a higher resolution than another signal generated by another of the n probes. In one example, the probes (with a high resolution probe mounted in the center of an array of low resolution probes) are radar detectors in a satellite used to measure elevation of the surface of earth, and when a flat surface such as a body of water is detected, all probes provide the same value of the elevation, although at different resolutions. Use of a resolution enhancer as described herein in a ground station that receives signals from the probes permits elevation of the flat surface to be displayed at the high resolution as compared to the display of elevations of terrains other than the flat surface. Accordingly, numerous such embodiments, implementations and variants are encompassed by the attached claims.

Note that resolution reducer 310 (FIG. 3B) and resolution enhancer 320 need not be present in the same processor, and in one embodiment are present in different discrete devices (reducer 310 being present in probes in a satellite, and enhancer 320 being present in a ground station). In such an embodiment, buses 311 and 312A–312Z do not exist, because the probes simply produce the signals on buses 314 and 313A–313Z (each probe being coupled to a single one of the just-described buses).

Another embodiment of a processor includes, in intermediate circuits 330, a lossy compression circuit that compresses the signals on each of buses 314 and 313A–313Z (FIG. 3B), and a decompression circuit that recovers the signals to be provided on buses 321 and 324A–324Z. In this embodiment, the signal recovered from the compressed version of high resolution signal on bus 314 and supplied to bus 321 is a medium resolution signal (due to the "lossy" nature of the compression circuit). Therefore, when all signals on buses 314 and 313A–313Z are identical (and at a high resolution), all signals on buses 323 and 322A–322Z are also identical (and at a medium resolution due to supplementing of the low resolution signals from buses 324A–3241 by bits from the medium resolution signal on bus 321). When signals on buses 314 and 313A–313Z are different (although at a high resolution), all signals on buses 323 and 322A–322Z are also different, with bus 323 carrying a medium resolution signal and buses 322A–322Z carrying signals that effectively have a lower resolution.

Yet another embodiment of a processor does not have a resolution reducer 310 (FIG. 3A), and instead has a signal width reducer 810 (FIG. 8A) that maintains a first input signal (also called "high width signal") unchanged while reducing the size of a second input signal, e.g. by dropping (using a truncator or a clamp unit) a number (e.g. three) of most significant bits (instead of the least significant bits as discussed above in reference to FIG. 3A) to obtain an output signal (also called "low width signal"). Such an embodiment is useful in situations where differences between two such signals are small enough to be encoded in a fewer number of bits than the signals themselves. In such an embodiment, a signal width enhancer 820 (FIG. 8A) supplements the low width signal with bits from the unchanged high width signal (i.e. first input signal) to obtain an enhanced width signal (e.g., by use of adders 825A–825Z as described below in reference to FIG. 8B). Such situations may occur, e.g. when the two input signals are generated by two probes that are located sufficiently close to each other to generate signals conforming to the just described criterion (e.g. temperature sensors mounted 1 mm apart around the circumference of a 10 cm diameter pipe carrying water under laminar flow conditions generate signals that are fractionally different, thereby requiring that only the fractional part of the second input signal be preserved between signal width reducer 810 and signal width enhancer 820).

Note that error is introduced by signal width enhancer 820 when the just-described condition is not met, i.e. when the predetermined number of most significant bits of the two high width signals are different, because the bits in the second input signal are supplemented by corresponding bits in the first input signal. As discussed above in reference to intermediate circuits 330 (FIG. 3B), in this embodiment as well, intermediate circuits 830 can include any type of circuit, such as a storage circuit, a transmission circuit, a compression circuit and a decompression circuit as described above.

In one implementation, a signal width reducer 810 (FIG. 8B) includes a number Z of subtractors 815A–815Z (one less than the total number of signals received by signal width reducer 810) that subtract the respective signals on buses 812A–812Z from the high width signal on bus 811. Signal width reducer 810 also includes a number Z of clamp units 816A–816Z that are similar to clamp unit 7821 (FIG. 7E) and are used to clamp their output signals to the range of signals allowed on the respective output buses 813A–813Z (e.g., 7 bits and 1 signbit), thereby to effectively drop a number (e.g., 17) of most significant bits. Note that clamp units 816A–816Z can be replaced by truncators (e.g. truncators 514–516 in FIG. 5A) if the maximum difference between a signal on any one of buses 812A–812Z and the high width signal on bus 811 is less than the number of bits in buses 813A–813Z (thereby to ensure that there is no overflow during passage of the output signal from a subtractor 815I to the respective bus 813I).

In this implementation, signal width enhancer 820 includes a number Z of adders 825A–825Z that add the input signals on the respective input buses 824A–824Z to the high bits signal (on input bus 821) thereby to generate the enhanced bit signals on buses 822A–822Z. In this example (FIG. 8B), the input buses 811 and 812A–812Z, carry 24-bit signals, whereas the low bits buses 813A–813Z carry 8-bit signals. Note that in other examples buses of other numbers of bits can be used (with appropriate modifications to the respective items 815A–815Z, 816A–816Z and 825A–825Z). Note that instead of subtraction and addition (illustrated in FIG. 8B), other operations such as division and multiplication can be used.

Numerous modifications and adaptations of the embodiments described herein are encompassed by the attached claims.

What is claimed is:

1. A circuit comprising:
   a memory including a first storage circuit and a second storage circuit, wherein:
      the first storage circuit has a plurality of first storage output terminals coupled to a first storage output bus, the first storage output bus having a first number of lines; and
      the second storage circuit has a plurality of second storage output terminals coupled to a second storage output bus, the second storage output bus having a second number of lines, the second number being less than the first number; and
   a resolution enhancer having a first enhancer output bus and a second enhancer output bus, wherein each of the first enhancer output bus and the second enhancer output bus has the second number of most significant lines and a third number of least significant lines, the third number being the difference between the second number and the first number, and the resolution enhancer includes:
      a plurality of first enhancer lines, each first enhancer line being coupled to a line in the first enhancer output bus and to a line in the first storage output bus; and
      a supplementor having:
         a plurality of second enhancer lines, each second enhancer line being coupled to a least significant line in the second enhancer output bus and to a least significant line in the first storage output bus; and
         a plurality of third enhancer lines, each third enhancer line being coupled to a most significant line in the second enhancer output bus and to a most significant line in the second storage output bus.

2. The circuit of claim 1 wherein the first storage circuit has a plurality of first storage input terminals, and the second storage circuit has a plurality of second storage input terminals, the circuit further comprising:
   an adder having a plurality of first adder input terminals coupled to the first enhancer output bus, a plurality of second adder input terminals coupled to the second enhancer output bus, and an adder output bus coupled to a frame buffer memory.

3. A circuit comprising:
   a memory including a first storage circuit and a second storage circuit, wherein:
      the first storage circuit has a plurality of first storage input terminals coupled to a first storage input bus, the first storage input bus having a first number of input lines; and
      the second storage circuit has a plurality of second storage input terminals coupled to a second storage input bus, the second storage input bus having a second number of input lines, the second number being less than the first number; and
   a resolution reducer having a first reducer input bus and a second reducer input bus, wherein each reducer input bus has input lines equal in number to input lines included in the first storage input bus, and each reducer input bus is coupled to a corresponding one of the storage input buses.

4. The circuit of claim 3 wherein the resolution reducer includes a truncator coupled between the second reducer input bus and the second storage input bus, the truncator including:
   a plurality of truncator lines, each truncator line being coupled to a line in the second reducer input bus and to a most significant line in the second storage input bus, the truncator lines being equal in number to the second number.

5. The circuit of claim 3 wherein:
   the resolution reducer includes a mapping unit coupled between the second reducer input bus and the second storage input bus.

6. The circuit of claim 5 wherein:
   the mapping unit includes a luminance generator.

7. A circuit for use in a graphics processor, the circuit comprising:
   a plurality of low resolution buses;
   a high resolution bus having a first number of lines, the first number being greater than the number of lines in any one of said low resolution buses;
   a plurality of enhanced resolution buses in a number equal to a number of low resolution buses in said plurality; and
   a resolution enhancer comprising:
      a plurality of first lines, each first line being coupled to a line in a low resolution bus; and
      a plurality of second lines, each second line being coupled to a least significant line in said high resolution bus;
   wherein each enhanced resolution bus has:
   a plurality of most significant lines coupled by a group of the first lines to a low resolution bus, the first lines in the group being equal in number to a second number of lines included in said low resolution bus; and
   a plurality of least significant lines coupled by a group of the second lines to a high resolution bus, the second lines in the group being equal in number to the difference between the first number and the second number.

8. The circuit of claim 7 wherein:
each of said low resolution buses has lines equal in number to another of said low resolution buses.

9. The circuit of claim 7 wherein:
each of said low resolution buses has lines different in number from another of said low resolution buses.

10. The circuit of claim 7 further comprising:
a plurality of first adders, each first adder being coupled to receive input signals from at least two buses selected from the group consisting of the enhanced resolution buses and the high resolution bus.

11. The circuit of claim 10 further comprising:
a second adder coupled to receive signals from two of said first adders, the second adder having an output bus for coupling to a frame buffer memory external to said graphics processor.

12. The circuit of claim 7 further comprising:
a plurality of storage circuits at least equal in number to a number of low resolution buses, each storage circuit having output terminals coupled to a corresponding low resolution bus; and
an additional storage circuit having output terminals coupled to said high resolution bus.

13. The circuit of claim 12 wherein:
each storage circuit in said plurality has a first number of storage locations; and
the additional storage circuit has a second number of storage locations, the second number being greater than the first number.

14. The circuit of claim 12 further comprising:
a resolution reducer having a first reducer input bus and a plurality of second reducer input buses, wherein the first reducer input bus has lines equal in number to lines in each of said second reducer input buses, each second reducer input bus being coupled to one of said low resolution buses, and the first reducer input bus being coupled to the high resolution bus.

15. The circuit of claim 14 wherein the resolution reducer includes a group of truncators, the truncators in said group being at least equal in number to the number of low resolution buses in said plurality.

16. A method for converting a low resolution signal into an enhanced resolution signal using a high resolution signal, the method comprising:
receiving the high resolution signal, the high resolution signal comprising a first number of bits including one or more least significant bits;
receiving the low resolution signal, the low resolution signal comprising a second number of bits, the second number being less than the first number;
passing the least significant bits of the high resolution signal as least significant bits of the enhanced resolution signal; and
passing the low resolution signal as most significant bits of the enhanced resolution signal,
wherein the enhanced resolution signal comprises the first number of bits.

17. The method of claim 16 further comprising:
storing the high resolution signal; and
storing the low resolution signal.

18. The method of claim 17 wherein:
said passing is performed subsequent to said storings and subsequent to retrieval of the high resolution signal and the low resolution signal.

19. The method of claim 17 wherein:
said passing is performed simultaneously with said storings.

20. The method of claim 16 wherein:
each of said high resolution signal and said enhanced resolution signal indicate a color in a region of a pixel;
said method further comprises computing an average of at least said high resolution signal and said enhanced resolution signal to generate an averaged color signal; and
displaying said pixel using said averaged color signal.

21. The method of claim 16 wherein:
each of said high resolution signal and said enhanced resolution signal indicate a respective color; and
each of said high resolution signal and said enhanced resolution signal are identical when said signals represent multisamples of a pixel located in an interior region of an image.

22. The method of claim 21 further comprises computing an average of said high resolution signal and said enhanced resolution signal to generate an averaged color signal used to display said pixel.

23. The method of claim 16 further comprising:
receiving a second low resolution signal; and
passing another enhanced resolution signal that includes the second low resolution signal and the least significant bits of the high resolution signal.

24. A method for processing a plurality of signals comprising:
receiving a first high resolution signal and a second high resolution signal, each including a first number of bits;
reducing a resolution of the second high resolution signal by dropping a second number of least significant bits of the second high resolution signal, the second number being less than the first number, thereby producing a first low resolution signal, while maintaining the first high resolution signal at a high resolution;
passing the first low resolution signal and the first high resolution signal; and
generating a first enhanced resolution signal, the first enhanced resolution signal comprising the first low resolution signal and the second number of least significant bits of the fist high resolution signal,
wherein the first enhanced resolution signal comprises the first number of bits.

25. The method of claim 24, further comprising:
receiving a third high resolution signal comprising the first number of bits;
dropping a third number of least significant bits of the third high resolution signal, the third number being less than the first number, thereby creating a second low resolution signal;
passing the second low resolution signal; and
generating a second enhanced resolution signal by adding to the second low resolution signal the third number of least significant bits of the first high resolution signal, the second enhanced resolution signal comprising the first number of bits.

26. The method of claim 25, wherein the third number is equal to the second number.

27. The method of claim 25, wherein the third number is different from the second number.

28. The method of claim 24, wherein each of the first and second high resolution signals indicates a color in a region within a pixel, the method further comprising:

computing an average of at least the first enhanced resolution signal and the first high resolution signal to generate an averaged color signal; and displaying the pixel using the averaged color signal.

29. The method of claim 24, further comprising:

mapping the first and second high resolution signals before reducing the resolution of the second high resolution signal; and demapping the first enhanced resolution signal after generating the first enhanced resolution signal.

30. The method of claim 29, wherein the step of mapping the first and second high resolution signals comprises converting each of the first and second high resolution signals from a linear encoding to a logarithmic encoding.

31. The method of claim 29, wherein:

the first and second high resolution signals comprise color signals; and the step of mapping the first and second high resolution signals comprises transforming each of the first and second high resolution signals to a lumina color difference signal.

32. The method of claim 31, wherein:

each color signal comprises a red value (R), a green value (G), and a blue value (B); and the step of transforming the first and second high resolution signals to lumina color difference signals includes computing a luminance value (Y) for each color signal, where $Y=\frac{1}{4}R+\frac{5}{8}G+\frac{1}{8}B$.

33. The method of claim 31, wherein the first low resolution signal comprises the luminance value of the corresponding lumina color difference signal.

34. The method of claim 24, further comprising:

storing the first low resolution signal and the first high resolution signal after reducing the resolution of the second high resolution signal.

35. The method of claim 34, further comprising:

compressing the first high resolution signal prior to storing the first high resolution signal; and decompressing the first high resolution signal prior to generating a first enhanced resolution signal.

36. The method of claim 35, wherein compressing the first high resolution signal is performed losslessly.

37. The method of claim 35, further comprising:

compressing the first low resolution signal prior to storing the first low resolution signal; and decompressing the first low resolution signal prior to generating a first enhanced resolution signal.

38. The method of claim 37, wherein compressing the first low resolution signal is performed losslessly.

39. A circuit comprising:

a resolution reducer configured to receive a first high resolution signal and a second high resolution signal each having a first number of bits and to reduce a resolution of the second high resolution signal by dropping a second number of least significant bits of the second high resolution signal, the second number being less than the first number, thereby producing a first low resolution signal, while maintaining the first high resolution signal at a high resolution;

a high resolution bus coupled to the resolution reducer and configured to pass the first high resolution signal;

a first low resolution bus coupled to the resolution reducer and configured to pass the first low resolution signal; and a resolution enhancer coupled to the high resolution bus and the first low resolution bus and configured to generate a first enhanced resolution signal, the first enhanced resolution signal comprising the first low resolution signal and the second number of least significant bits of the first high resolution signal, wherein the first enhanced resolution signal comprises the first number of bits.

40. The circuit of claim 39, wherein:

the resolution reducer is further configured to receive a third high resolution signal, the third high resolution signal comprising the first number of bits, and to drop a third number of least significant bits from the third high resolution signal, the third number being less than the first number, thereby producing a second low resolution signal;

the circuit further comprises a second low resolution bus coupled between the resolution reducer and the resolution enhancer and configured to pass the second low resolution signal; and the resolution enhancer is further configured to add the third number of bits from the first high resolution signal to the second low resolution signal, hereby producing a second enhanced resolution signal, the second enhanced resolution signal comprising the first number of bits.

41. The circuit of claim 40, wherein the second number is equal to the third number.

42. The circuit of claim 40, wherein the second number is different from the third number.

* * * * *